United States Patent
Mehouachi

(10) Patent No.: US 11,983,635 B1
(45) Date of Patent: May 14, 2024

(54) METHODS, SYSTEMS, APPARATUSES, AND DEVICES FOR SIFRIAN-BASED NEURAL NETWORK TRAINING

(71) Applicant: Fares Mehouachi, Gaafour (TN)

(72) Inventor: Fares Mehouachi, Gaafour (TN)

( * ) Notice: Subject to any disclaimer, the term of this patent is extended or adjusted under 35 U.S.C. 154(b) by 0 days.

(21) Appl. No.: 18/483,998

(22) Filed: Oct. 10, 2023

(51) Int. Cl.
*G06N 3/08* (2023.01)
*G06N 3/084* (2023.01)

(52) U.S. Cl.
CPC .................. *G06N 3/084* (2013.01)

(58) Field of Classification Search
None
See application file for complete search history.

(56) References Cited

U.S. PATENT DOCUMENTS 11,551,416 B1 * 1/2023 Mehouachi ............. G06T 17/05

OTHER PUBLICATIONS

Mehouachi et al ("Exact Stochastic Second Order Deep Learning" Apr. 2021) (Year: 2021).*
Anonymous authors ("Exact Stochastic Newton Method for Deep Learning: The Feedforward Networks Case" Jan. 2022) (Year: 2022).*
Openreview ("Revision History for Exact StochasticNewton Method for" 2023) (Year: 2023).*

* cited by examiner

*Primary Examiner* — Lut Wong

(57) ABSTRACT

A method for training a neural network model having layers and parameters, comprises providing an input corresponding to each of samples comprised in a batch of a training dataset to an input layer, obtaining outputs from the neural network model, calculating a loss function for each of the samples based on the outputs and corresponding desired values, and determining values for minimizing a mismatch between the outputs and the corresponding desired values across the samples for the parameters based on the loss function. The determining of the values comprises running a forward model through the layers, determining a Sifrian functional for the layers based on the forward model, backpropgation, and gradient definition, determining equations from the Sifrian functional, performing transformation and optionally reduction to get a pivotal Sifr equation and solving the equation to estimate a second-order update for the purpose of the neural network model training.

18 Claims, 20 Drawing Sheets

METHODS, SYSTEMS, APPARATUSES, AND DEVICES FOR SIFRIAN-BASED NEURAL NETWORK TRAINING

FIELD OF THE INVENTION

Generally, the present disclosure relates to the field of machine learning, particularly focusing on methods, systems, and computer-readable media that optimize the training process of various types of neural networks, using the Sifr optimizer, built around the concept of the Sifrian and its derivatives that allows the inclusion of second order information into the neural network training process.

BACKGROUND OF THE INVENTION

Neural networks, integral to the fields of machine learning and Artificial Intelligence (AI), primarily depend on an iterative learning process that employs gradient-descent algorithms and backpropagation. Backpropagation is a sequence of differentiation operations that simplifies gradient estimation, acting as the core of most descent algorithms to update network weights and biases. This, in turn, minimizes discrepancies between the desired and the actual output of the neural network.

However, gradient descent methods and backpropagation mainly offer first-order derivative information without scaling. This absence of scaling can lead to a slow convergence rate, local minima trapping, and hyperparameter sensitivity, particularly in the context of deep neural networks. Hence, there is a persistent need for the development of methodologies that improve the learning process and overcome these limitations.

Incorporation of curvature information, i.e., second-order derivatives, into the process, can potentially offer a solution to these challenges. However, this introduces significant computational complexity. The matrix of second-order derivatives, known as the Hessian, is often extremely large—for a neural network with 1 million parameters, the Hessian would comprise 1 trillion parameters requiring computation, storage, and inversion for gradient scaling. This problem is magnified in large language models where the number of parameters escalates into billions.

Contemporary state-of-the-art approaches circumvent the direct computation of the Hessian by leveraging fast Hessian-vector multiplication algorithms, followed by an iterative search for an appropriate direction vector. Other techniques employ low rank iterative updates, such as Broyden-Fletcher-Goldfarb-Shanno (BFGS) and its variants, estimating the effect of the Hessian inverse via a low-rank update at each training step.

Despite their benefits, these methods possess limitations. Hessian-Free methods, for instance, rely on guessing a high-dimensional vector with only a few iterations. As such, the span of covered dimensions is restricted compared to the actual solution space, and the model updated might be far from the optimal second-order update. Similarly, BFGS grapples with the enormity of the Hessian, and the rank two approximations used are inherently approximate in nature. Enhancing these approximations naively could impose high computational costs.

With the computational complexities and scaling limitations, alternatives such as the natural gradient method have been explored. This method replaces the Hessian with the empirical Fisher information matrix, introducing curvature information into the training process. Most notably, the Kronecker-Factored Approximate Curvature (K-FAC) method attempts to manage some of these computational challenges. However, while showing promise, it has yet to achieve the computational efficiency, scalability, and reduced wall clock time needed to compete with mainstream optimizers like the Stochastic Gradient Descent (SGD) and ADAM.

These aforementioned shortcomings underline the urgent need for advancements in the learning process of neural networks that effectively incorporate second-order information without compromising on computational efficiency or practical viability.

In response to this need, the prior work in the field led to the development of the Sifrian system. This milestone, accomplished by Mehouachi and Kasmi in 2021 (Exact Stochastic Second Order Deep Learning. arXiv preprint arXiv:2104.03804 (2021) and Exact Stochastic Newton Method for Deep Learning: the feedforward networks case (2021)), laid the foundation for further research and development. The Sifrian described by Mehouachi and Kasmi solve only for one sample at a time. The Sifrian system found successful application in the field of wave propagation and imaging in the frequency domain. Mehouachi, Yang, and Kasmi exploited this aspect in their patent (U.S. Pat. No. 11,551,416. 10 Jan. 2023), where each frequency was handled individually, analogous to the limited case of treating only one sample at a time in neural network training.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for training a neural network model having a plurality of layers comprising an input layer, at least one middle layer, one or more output layers, and a plurality of parameters commonly referred to as weights and biases, in accordance with some embodiments. Accordingly, the method may include a step of providing an input to the input layer. Further, the input corresponds to each of a plurality of samples comprised in a batch of a training dataset. Further, the method may include a step of obtaining one or more outputs from the neural network model based on the input. Further, the method may include a step of calculating a loss function for each of the plurality of samples comprised in the batch based on the one or more outputs and one or more corresponding desired values for each of the plurality of samples comprised in the batch. Further, the method may include a step of determining a plurality of values for the plurality of parameters based on the loss function. Further, the plurality of values for the plurality of parameters minimizes a mismatch between the one or more outputs and the one or more corresponding desired values across the plurality of samples comprised in the batch. Further, the determining of the plurality of values for the plurality of parameters may include running a forward model through the plurality of layers based on the neural network model. Further, the determining of the plurality of values for the plurality of parameters, commonly referred to as weights and biases, may include determining a Sifrian functional which is a second-order Lagrangian for the plurality of layers based on the forward model, backpropagation, and gradient definition. Further, the Sifrian functional may be null when a forward pass, a backward pass, and a gradient definition associated with the neural network model may be verified. Further, the determining of the plurality of values for the plurality of parameters may include determining a plurality of equations from the Sifrian functional. Further, the determining of the plurality of values for the plurality of parameters may include transforming, reducing, and solving the plurality of equations.

Further, disclosed herein is a method for training a neural network model having a plurality of layers comprising an input layer, at least one middle layer, one or more output layers, and a plurality of parameters commonly referred to as weights and biases, in accordance with some embodiments. Accordingly, the method may include a step of providing an input to the input layer. Further, the input corresponds to each of a plurality of samples comprised in a batch of a training dataset. Further, the method may include a step of obtaining one or more outputs from the neural network model based on the input. Further, the method may include a step of calculating a loss function for each of the plurality of samples comprised in the batch based on the one or more outputs and one or more corresponding desired variables for each of the plurality of samples comprised in the batch. Further, the method may include a step of determining a plurality of values for the plurality of parameters based on the loss function. Further, the plurality of values for the plurality of parameters minimizes a mismatch between the one or more outputs and the one or more corresponding desired variables across the plurality of samples comprised in the batch. Further, the determining of the plurality of values for the plurality of parameters may include running a forward model through the plurality of layers based on the neural network model. Further, the determining of the plurality of values for the plurality of parameters may include determining a Sifrian functional which is a second-order Lagrangian for the plurality of layers based on the forward model, backpropagation, and gradient definition. Further, the Sifrian functional may be null when a forward pass, a backward pass, and a gradient definition associated with the neural network model may be verified. Further, the determining of the plurality of values for the plurality of parameters may include determining a plurality of equations from the Sifrian functional. Further, the determining of the plurality of values for the plurality of parameters may include transforming, reducing, and solving the plurality of equations. Further, the solving of the plurality of equations may include determining a pivotal equation from the plurality of equations. Further, the solving of the plurality of equations may include resolving the pivotal equation based on the determining of the pivotal equation. Further, the solving of the plurality of equations may include obtaining at least a second-order update for the plurality of parameters using the pivotal equation based on the resolving. Further, the determining of the plurality of values of the plurality of parameters may be based on at least the second-order update.

Further disclosed herein is a neural network model comprising a plurality of layers comprising an input layer, at least one middle layer, one or more output layers, and a plurality of parameters commonly referred to as weights and biases, in accordance with some embodiments. Further, the neural network model may be trained using a method. Further, the method may include a step of providing an input to the input layer. Further, the input corresponds to each of a plurality of samples comprised in a batch of a training dataset. Further, the method may include a step of obtaining one or more outputs based on the neural network model based on the input. Further, the method may include a step of calculating a loss function for each of the plurality of samples comprised in the batch based on the one or more outputs and one or more corresponding desired values for each of the plurality of samples comprised in the batch. Further, the method may include a step of determining a plurality of values for the plurality of parameters based on the loss function. Further, the plurality of values for the plurality of parameters minimizes a mismatch between the one or more outputs and the one or more corresponding desired values across the plurality of samples comprised in the batch. Further, the determining of the plurality of values for the plurality of parameters may include running a forward model through the plurality of layers based on the neural network model. Further, the determining of the plurality of values for the plurality of parameters may include determining a Sifrian functional which is a second-order Lagrangian for the plurality of layers based on the forward model, backpropagation, and gradient definition. Further, the Sifrian functional may be null when a forward pass, a backward pass, and a gradient definition associated with the neural network model may be verified. Further, the determining of the plurality of values for the plurality of parameters may include determining a plurality of equations from the Sifrian functional. Further, the determining of the plurality of values for the plurality of parameters may include transforming, reducing, and solving the plurality of equations.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
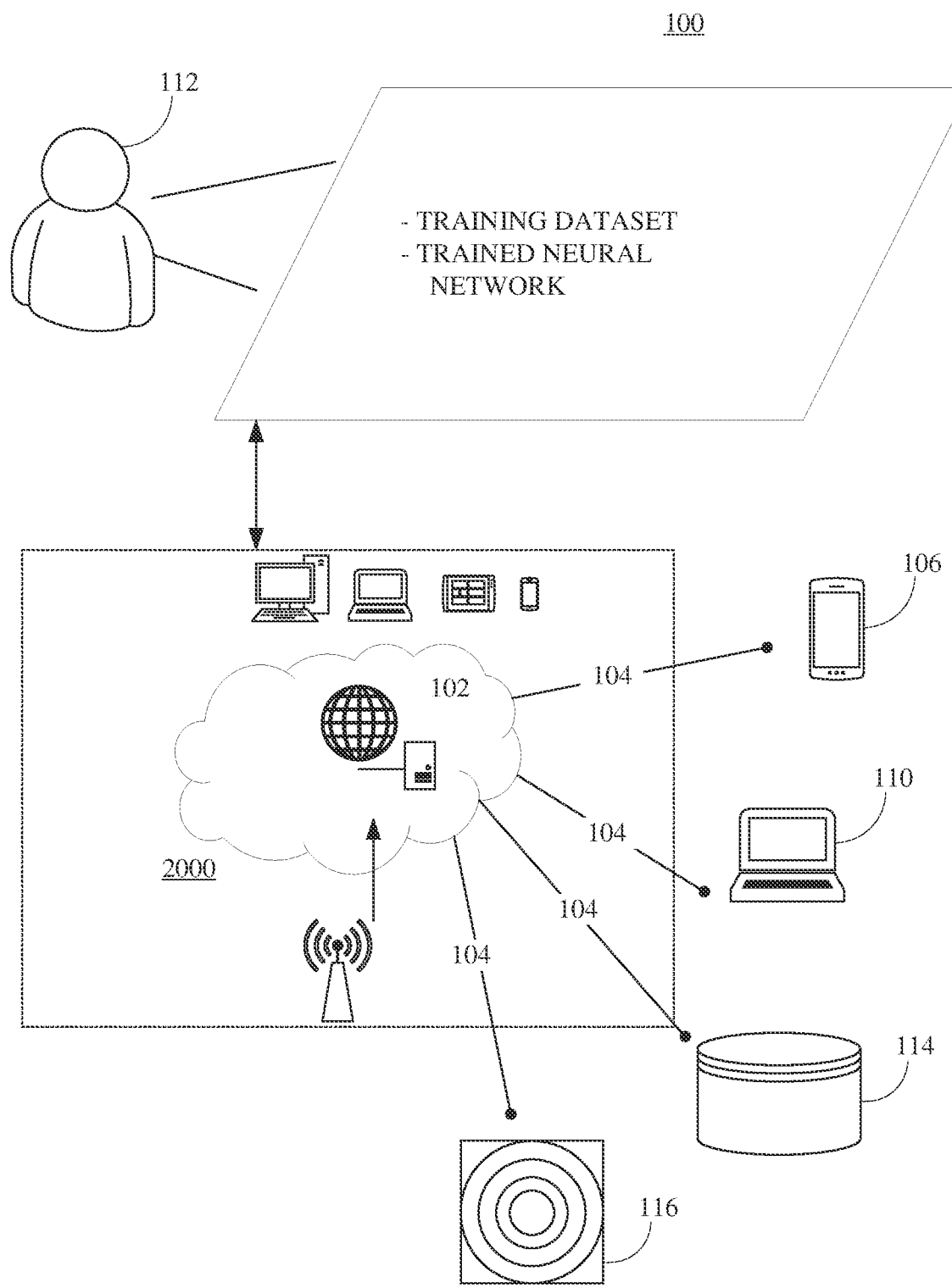
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one", but does not exclude a plurality unless the contextual use dictates otherwise. When used herein to join a list of items, "or" denotes "at least one of the items", but does not exclude a plurality of items of the list. Finally, when used herein to join a list of items, "and" denotes "all of the items of the list".

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for training neural networks, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g., a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes a method for training a neural network model (a neural network).

Further, the present disclosure describes a method termed the 'Sifr optimizer', designed to integrate seamlessly into the training procedure of neural networks to expedite their training process. Further, the Sifr optimizer is a unique resolution of the Sifrian system of equations in a general setting. The Sifrian, a second-order Lagrangian, intertwines three essential elements of neural network training, the forward pass, backpropagation, and gradient definition updates into a unified functional. This unification yields a comprehensive characterization of the second-order Newton direction. Further, the method is a solution tailored specifically for batch training scenarios, paving the way for more efficient and practical neural network training.

Further, the Sifr optimizer disclosed in the present disclosure leverages the Sifrian system's insights to deliver a more efficient second-order update of neural network parameters in batch cases. This second-order update allows for a more accurate and efficient adjustment of the neural network parameters, leading to faster convergence and enhanced training performance. Further, the Sifr optimizer exhibits versatility, applicable across a wide range of neural network types and machine learning tasks, from simple classification problems to intricate deep learning applications. Despite the complexity of the underlying mathematics, the implementation of the Sifr optimizer does not significantly elevate computational complexity, making it a viable choice for a myriad of machine learning scenarios.

Further, the Sifr optimizer substantially extends the scope of the Sifrian system and its application in neural network training. The Sifr optimizer is a sophisticated solution designed explicitly for batch training scenarios, thereby addressing the shortcomings of the previous implementations of the Sifrian system in the context of neural network training. By maintaining the comprehensive nature of the Sifrian system while making it practical for batch processing, the Sifr optimizer pushes the boundaries of neural network training efficiency and performance. Further, the Sifr optimizer outperforms the previous approaches in neural network training, making it a notable advancement in the realm of machine learning.

Further, the present disclosure describes methods for training neural networks (or neural network models) by implementing the Sifr optimizer. Further, one or more steps of the methods are performed using the Sifr optimizer.

Further, the Sifr optimizer implements the process of neural network training for a neural network. Further, the neural network is regarded as a function $f$, which takes an input $x_{0,p}$, (with '0' signifying the input layer) and generates an output $x_{n,p}$, (where 'n' signifies the output layer). The p index designates a specific sample from a batch of the training dataset and falls within the set $p \in \{1, \ldots, n_B\}$, where n B represents the batch size. The parameters of the network, including weights, biases, and other factors, are collectively symbolized as $\theta$. The neural network's forward pass involves processing the inputs $x_{n,p}=f(x_{0,p}; \theta)$ and calculating the loss function $\ell(x_{n,p}, y_p)$. Here, $y_p$ is the desired output or label for the sample p. The training process entails discovering an optimal $\theta$ that minimizes mismatches, captured by the expression $$\mathrm{argmin}_\theta \frac{1}{n_B} \sum_p \ell(f(x_{0,p}; \theta), y_p).$$

This equation essentially outlines the pursuit of the ideal $\theta$ that reduces the collective mismatch between the network's output and the desired output across all samples in a batch. Gradient based method relies essentially on the backpropagation to compute the gradient $\nabla_\theta \ell$. An estimation of the gradient is given by the chain rule:

$$\nabla_\theta \ell = \frac{1}{n_B} \sum_p \left(\frac{dx_{n,p}}{d\theta}\right) \frac{\partial \ell}{\partial x_{n,p}}.$$

The derivative $$\frac{\partial \ell}{\partial x_{n,p}}$$

is easy to compute and it is often done with an analytic expression. The quantity $$\left(\frac{dx_{n,p}}{d\theta}\right)$$

is called the Jacobian and its computation is a bottleneck that is avoided through the concept of backpropagation. $\ell$ is a scalar, $\theta$ is a vector, $$\frac{\partial \ell}{\partial x_{n,p}}$$

is a vector with the same dimension as $x_{n,p}$ and $$\left(\frac{dx_{n,p}}{d\theta}\right)$$

is a matrix (rank 2 tensor) with a row number similar to the dimension of $\theta$ and a column number similar to $x_{n,p}$.

Further, the principles of backpropagation and the Sifrian system are illustrated using an example of a feedforward neural network. In this context, the neural network graph is a straight line, where each layer connects to at most two other layers—the ones immediately preceding and following it—excluding the input and output layers. The parameters $\theta$ for a feedforward network generally consist of a sequence of weight matrices and bias vectors, symbolized as $\theta=\{W_k, \beta_k\}_{k=1..n}$. The transition between layers, or the forward model, is expressed as: $x_{k,p}=\sigma(W_k x_{k-1,p}+\beta_k)$, where $\sigma$ denotes an activation function like the sigmoid function or the Rectified Linear Unit (ReLU) function. Although neural networks can incorporate more complex components such as skip connections, convolutions, attention heads, or recurrent connections, the basic principles explained using the feedforward case still apply. These principles can extend to more sophisticated scenarios, provided that the neural network graph is directed and acyclic—in other words, there is a clear direction through the network's graph, which enables the calculation of backpropagated errors. The gradient could be computed using the Lagrangian, as training neural networks could be framed as a constrained minimization problem. The Lagrangian L multiplies each step of the forward model with a multiplier $\lambda_{k,p}$, using an inner product and adding the loss function $\ell$. $L(x, W, \beta)=\ell + \Sigma_{k,p} \langle x_{k,p} - \sigma(W_k x_{k-1,p}+\beta_k), \lambda_{k,p} \rangle$, if the forward model is verified then the Lagrangian is equal to the loss function $L=\ell$. The multipliers' values are flexible, and we select values that simplify our task of efficiently computing the gradient. We then differentiate the Lagrangian with respect to the weights and biases.

$$\begin{cases} \dfrac{dL}{dW_k} = \dfrac{\partial L}{\partial W_k} + \sum_{p,l} \dfrac{dx_{l,p}}{dW_k} \dfrac{\partial L}{\partial x_{l,p}}, \\ \dfrac{dL}{d\beta_k} = \dfrac{\partial L}{\partial \beta_k} + \sum_{p,l} \dfrac{dx_{l,p}}{d\beta_k} \dfrac{\partial L}{\partial x_{l,p}}, \end{cases} \forall k \in \{1 \ldots n\},$$

If the multipliers $\lambda_{k,p}$ is selected such that $$\dfrac{\partial L}{\partial x_{l,p}} = 0,$$

for all values of p and for all layers then the complicated terms in the above expression can be removed to obtain $$\dfrac{dL}{dW_k} = \dfrac{\partial L}{\partial W_k}$$

and $$\dfrac{dL}{d\beta_k} = \dfrac{\partial L}{\partial \beta_k},$$

which are straightforward to compute. This approach yields the following backpropagation system:

$$\dfrac{\partial L}{\partial x_{p,k}} = 0 \rightarrow \lambda_{k,p} - 1_{k<n} W_{k+1}^T \nabla \sigma_{k+1,p} \lambda_{k+1,p} + 1_{k=n} \dfrac{\partial \ell}{\partial x_{n,p}} = 0,$$

The term $\nabla \sigma_{k+1,p}$ correspond to the derivative of the activation function at the layer k+1, when evaluating the sample p. The above equation is solved backward starting from the output layer, hence the name backpropagation. The gradient is given by:

$$\begin{cases} \nabla_{W_k} \ell = \dfrac{\partial L}{\partial W_k} = -\sum_p \nabla \sigma_{k,p} \lambda_{k,p} x_{k-1,p}^T, \\ \quad \forall k \in \{1..n\}, \qquad \forall k \in \{1 \ldots n\}, \\ \nabla_{\beta_k} \ell = \dfrac{\partial L}{\partial \beta_k} = -\sum_p \nabla \sigma_{k,p} \lambda_{k,p}, \end{cases}$$

The Sifrian system, conceptualized by Mehouachi and Kasmi (Mehouachi, Fares B., and Chaouki Kasmi. "Exact Stochastic Second Order Deep Learning." arXiv preprint arXiv:2104.03804 (2021); and "Exact Stochastic Newton Method for Deep Learning: the feedforward networks case." (2021)), offered a significant advancement but had a limitation. Its original formulation solved only for a single pattern at a time, which is not particularly practical. The general case of a mini-batch, more relevant in real-world applications, remained unsolved until now. The Sifrian system, which derives its name from the Arabic word 'Sifr' for zero, for a feedforward network, can be expressed as follows:

$$S(x, \lambda, N, \eta, \gamma, \zeta, \nabla_{W_k}\ell, \nabla_{\beta_k}\ell,) = \sum_{k,p} \langle x_{k,p} - \sigma(W_k x_{k-1,p} + \beta_k), \gamma_{k,p} \rangle +$$

$$\left\langle \lambda_{k,p} - 1_{k<n} W_{k+1}^T \nabla \sigma_{k+1,p} \lambda_{k+1,p} + \dfrac{\partial \ell}{\partial x_{k,p}}, \zeta_{k,p} \right\rangle +$$

$$\left\langle \nabla_{W_k} \ell + \sum_p \nabla \sigma_{k,p} \lambda_{k,p} x_{k-1,p}^T, N_k \right\rangle + \left\langle \nabla_{\beta_k} \ell + \sum_p \nabla \sigma_{k,p} \lambda_{k,p}, \eta_k \right\rangle,$$

The Sifrian introduces four new sets of multipliers ($\gamma_{k,p}$, $\zeta_{k,p}$)$_{k,p}$ and ($N_k$, $\eta_k$)$_k$, which needs to be determined to characterize the Newton update. Notably, the Sifrian is always null when the forward, backward, and gradient definitions are verified, implying that all of its derivatives are also null. Differentiation with respect to weights and biases leads to the following equation:

$$\begin{cases} \dfrac{dS}{dW_k} = 0 = \dfrac{\partial S}{\partial W_k} + \sum_{p,l} \dfrac{dx_{l,p}}{dW_k} \dfrac{\partial S}{\partial x_{l,p}} + \dfrac{d\lambda_{l,p}}{dW_k} \dfrac{\partial S}{\partial \lambda_{l,p}} + \sum_m \dfrac{d\nabla_{W_m}\ell}{dW_k} \dfrac{\partial S}{\partial \nabla_{W_m}\ell} + \dfrac{d\nabla_{\beta_m}\ell}{dW_k} \dfrac{\partial S}{\partial \nabla_{\beta_m}\ell}, \\ \dfrac{dS}{d\beta_k} = 0 = \dfrac{\partial S}{\partial \beta_k} + \sum_{p,l} \dfrac{dx_{l,p}}{d\beta_k} \dfrac{\partial S}{\partial x_{l,p}} + \dfrac{d\lambda_{l,p}}{d\beta_k} \dfrac{\partial S}{\partial \lambda_{l,p}} + \sum_m \dfrac{d\nabla_{W_m}\ell}{d\beta_k} \dfrac{\partial S}{\partial \nabla_{W_m}\ell} + \dfrac{d\nabla_{\beta_m}\ell}{d\beta_k} \dfrac{\partial S}{\partial \nabla_{\beta_m}\ell}, \end{cases}$$

The terms $$\left( \dfrac{d\nabla_{W_m}\ell}{dW_k}, \dfrac{d\nabla_{\beta_m}\ell}{dW_k}, \dfrac{d\nabla_{\beta_m}\ell}{d\beta_k} \right)$$

correspond to the building blocks of the sought after Hessian. Similar to the Lagrangian approach, the multipliers are selected to create the well-known Newton equation $$(\nabla_\theta^2 \ell) \begin{bmatrix} N \\ \eta \end{bmatrix} = \nabla_\theta \ell.$$

In this case, the multipliers N and $\eta$ are the second order-update. Such a characterization is equivalent to the following equations:

$$\begin{cases} \dfrac{\partial S}{\partial x_{l,p}} = 0, & \dfrac{\partial S}{\partial \lambda_{l,p}} = 0, \forall l \in \{1 \ldots n\}, \forall p, \\ \dfrac{\partial S}{\partial W_k} = -\nabla_{W_k}\ell, & \dfrac{\partial S}{\partial \beta_k} = -\nabla_{\beta_k}\ell, \forall k \in \{1 \ldots n\}, \end{cases}$$

For clarity and to avoid complex formulas, $\sigma$ is considered to be a piece-wise affine activation function. The above system translates to equations on the new multipliers, yielding four types of equations collectively referred to as the Sifrian system or Sifrian equations (Mehouachi, Fares B., and Chaouki Kasmi. "Exact Stochastic Second Order Deep Learning." arXiv preprint arXiv:2104.03804 (2021); and "Exact Stochastic Newton Method for Deep Learning: the feedforward networks case." (2021)).

$$\begin{cases} \sum_p \Delta\sigma_{k,p}(\gamma_{k,p} x_{k-1,p}^T + \lambda_{k,p} x_{k-1,p}^T + 1_{k>1}\lambda_{k,p}\zeta_{k-1,p}^T) = 0, \\ \sum_p \nabla\sigma_{k,p}(\gamma_{k,p} + \lambda_{k,p}) = 0, \\ \gamma_{k,p} - 1_{k<n} W_{k+1}^T \nabla\sigma_{k+1,p}\gamma_{k+1,p} + 1_{k=n} \frac{\partial^2 \ell}{\partial x_{n,p}^2} \zeta_{n,p} + 1_{k<n} N_{k+1}^T \nabla\sigma_{k+1,p}\lambda_{k+1} = 0, \forall\, p, \\ \zeta_{k,p} - 1_{k>1}\nabla\sigma_{k,p} W_k \zeta_{k-1,p} + \nabla\sigma_{k,p}(N_k x_{k-1,p} + \eta_k) = 0, \forall\, p, \end{cases}$$

The Hessian matrix could be expressed as $$\nabla_\theta^2 \ell = \sum_p \left(\frac{dx_{n,p}}{d\theta}\right) \frac{\partial^2 \ell}{\partial x_{n,p}^2} \left(\frac{dx_{n,p}}{d\theta}\right)^T + \left(\frac{d^2 x_{n,p}}{d\theta^2}\right) \frac{\partial \ell}{\partial x_{n,p}}.$$

The T corresponds to the transposition operator. The Gauss-Newton approximation leads to a positive estimation of the Hessian as follows:

$$\nabla_\theta^2 \ell \sim \frac{1}{n_B}\sum_p \left(\frac{dx_{n,p}}{d\theta}\right) \frac{\partial^2 \ell}{\partial x_{n,p}^2} \left(\frac{dx_{n,p}}{d\theta}\right)^T.$$

The Gauss-Newton method, notably as it is essentially one Jacobian calculation away from the Sifr optimizer. Unlike the Gauss-Newton approach, which is derived via truncation. The Sifr optimizer innovatively incorporates previously overlooked quadratic terms.

Mehouachi and Kasmi (2021) introduced the Sifrian system of equations, which delineates the dynamics of the Newton update with a level of granularity surpassing that of Pearlmutter's R-operator. However, solving this system has proven challenging. Until now, the solution has only been found in the narrow context of online training, where a single sample 'p' is considered. Yet, these online learning results are easily outdone by traditional methods such as stochastic gradient descent with momentum.

In the practical world of neural network training, a batch of data, i.e., multiple samples, is processed simultaneously, and a comprehensive solution to the Sifrian system in this context has remained elusive. The present disclosure describes a process for solving the Sifrian system that encompasses various strategies, including but not limited to a convexity correction, damping, dimensionality reduction, and direct or iterative solving.

Further, the Sifr optimizer disclosed in the present disclosure is a novel tool designed for the efficient training of neural networks using batches of training data. The optimizer's core component is an innovative resolution of the Sifrian system in batch cases. The Sifrian is a functional, inspired by the Lagrangian, that uniquely consolidates the forward pass, backpropagation, and gradient update into one unified functional. Contrasting the Lagrangian, the Sifrian excludes the loss function and introduces second-order adjoint variables. When chosen strategically, these variables lead to a precise and efficient characterization of the second-order update, which is called the Sifrian equation of Sifrian system. The term "Sifr", translating to "zero" in Arabic, was chosen because the Sifrian functional and its differentials remain zero throughout the training of neural networks, embodying the essence of this innovative approach. The term "Sifrian" originates from the Arabic word "sifr-ain" (Two-Zero), which highlights the unique feature of the functional that becomes null when both forward and backward equations are met, in both its original form and its derivative. The Sifrian functional and the Sifr optimizer application in this patent are inspired by this mathematical property, encapsulating the idea of "Inversion of the Two-Zero" in neural network optimization. The main innovation is the resolution of the complex Sifrian system in the batch scenario and building the Sifr optimizer around it for efficient neural network training.

Further, the present disclosure describes a method to optimize neural network learning. This method includes establishing the neural network with its associated parameters, such as weight matrices and bias vectors, formulating a loss function for error minimization, and integrating the gradient computed via backpropagation into the Sifrian characterization of the second order Newton update. Building the second order characterization involves differentiating the Sifrian functional to derive the co-adjoint equations for the forward and backward pass, as well as equations for second-order parameter updates. The main novelty of the Sifr optimizer is the resolution in the batch case. Through a process of judicious selection, the Sifrian system simplifies to a singular pivotal equation. To address the potential ill-conditioning of this key equation, damping is included. Depending on the model size, this equation can be directly inverted or sketched to reduce dimensionality before a direct solver or iterative solver can be used to deduce the Sifr update.

Further, the present disclosure describes a system for optimizing the learning process of neural networks. This system comprises a computing device and memory storage. The computing device is programmed to execute the method outlined above, with the memory storage configured to store the network parameters. These parameters are continually updated through the Sifr optimizer. The name "Sifr" was selected for this optimizer to underline its unique methodology and features. Translating to "zero" in Arabic, "Sifr" reflects the optimizer's dependence on a null functional to derive a second-order update. While the fundamental structure of the Sifr optimizer takes inspiration from the Newton method, the significant modifications implemented ensure it stands distinct. This substantial divergence justifies its distinct identity—the Sifr optimizer.

Further, the present disclosure describes systems, methods, and computer-readable media pertaining to the application of the Sifr Optimizer within machine learning paradigms. This optimizer capitalizes on curvature information to determine efficient second-order updates during the batch training process of neural networks. Deriving its approach from the Sifrian—a Lagrangian-like function—the Sifr Optimizer enables a detailed and intricate second-order characterization of the Newton direction. The Sifrian formulates a set of equations that capture the essence of the Newton update without involving the Hessian matrix directly. The Sifr Optimizer, a product of this system, is distilled to a single essential equation through a process of careful selection and differential considerations. This equation can be solved directly or further 'sketched' to yield a dimensionally reduced representation of the sought second-order update. The inversion process can be simplified using damping and an efficient estimation of the Gram matrix derived from this pivotal equation. Given the relatively smaller size of batches compared to parameter count in modern neural networks, this innovative approach allows for highly efficient neural network parameter updates. It provides a solution to the slow convergence issues linked to traditional gradient descent methods. Notably, the Sifr Optimizer, though drawing inspiration from the Newton method, distinguishes itself with enhanced computational resource efficiency and speed.

Further, the present disclosure describes a method for neural network training. The method incorporates collecting training, testing, and validation datasets, initializing network parameters such as weights and biases, executing forward passes on complete or batched training datasets, and iteratively updating the model. The model updating process continues until the network output aligns with a predetermined output within a specified threshold or after a certain number of iterations. This model and the associated optimization problem feature a loss function geared towards empirical risk minimization. The model, i.e., the neural network parameters, is iteratively updated based on the Sifr optimizer, which induces an exact Newton update at the output layer and deduces parameter perturbations facilitating this correction. This unique methodology, derived from the Sifrian functional which unifies the forward and backward passes of the neural network along with the gradient definition, dramatically contrasts with the original Newton method where the gradient is adjusted by neural network-wide curvature. The Sifrian functional, equal to zero when the forward and backward passes and gradient align with their neural network values, excludes the loss function, which measures output layer discrepancies. The method further includes generating network predictions with the updated model for performance evaluation.

Further, the present disclosure describes a method for neural network training involving a computing system. The system receives training data and commences the process of training a neural network. This process requires initializing parameters to evade null updates. The training process further involves generating output data, comparing it to the desired output, and verifying if the mismatches are within a tolerance threshold. The Sifrian functional is employed to fully characterize the second-order Newton direction, thereby guiding the optimization and inference of the neural network parameters. The Sifr optimizer builds on the Sifrian functional to provide a manageable and efficient solution. The training process further includes iteratively refining the model, using updates supplied by the Sifr optimizer, until the prediction data corresponds with the desired data within the predetermined tolerance threshold.

Further, the present disclosure describes a machine learning apparatus purposefully designed for training neural networks. This apparatus comprises an interface and a data processing unit. The interface is engineered to receive, accept, and store datasets, which serve as resources for training, validating, and testing the neural network. The stored data contributes to the learning process, enabling the improvement of neural network performance over time. The data processing unit, interconnected with the interface, oversees the execution of the model updating routine and manages any required synchronization. It is designed to generate prediction data by propagating an input sample through the trained neural network. Subsequently, the data processing unit utilizes a predetermined loss function to assess the disparity between the predicted output and the desired output. Should the deviation between these two datasets surpass a predefined tolerance threshold, this event initiates the continuation of the updating sequence. The data processing unit employs these quantified mismatches to iteratively refine the initial model and all subsequent updates using the Sifr optimizer. This iterative refinement continues until the predicted output closely approximates the desired output. The desired output can take various forms, ranging from classification labels to the input data itself for autoencoder models, and from text for language generation models to other outputs, depending on the task. In facilitating these iterative updates, the data processing unit resolves the Sifr pivotal equation, which incorporates a damping term to handle potential ill-conditioning. The data processing unit is also equipped with a solver for the Sifr update, which delivers an enhanced model that minimizes the mismatch between the predicted and actual data. The specific solver used can vary and may employ techniques such as but not limited to the Cholesky solver, iterative conjugate gradient, or Gauss-Jordan elimination method. The step length of the update is generally substantial, often close to one, which is a common attribute of any Newton-based method. Though the use of a line search strategy is optional, a fixed step length could alternatively be utilized. Ultimately, the data processing unit is designed to execute the iterative process either until the predicted output aligns with the desired output within the tolerance threshold, or until a predefined maximum number of iterations is reached. In machine learning, the gradient is a critical construct. It encapsulates the sensitivity of the model's loss function relative to variations in the model's parameters. Serving as the cornerstone of numerous machine learning algorithms, the gradient steers the modification of model parameters during the training phase, aiming to minimize prediction error. Another essential concept in machine learning is the Hessian, alternatively referred to as the Hessian matrix or the Hessian tensor. The Hessian is a square matrix composed of the second-order partial derivatives of a scalar-valued function or scalar field. As a rank-2 covariant symmetric tensor of second derivatives, the Hessian illustrates the local curvature of a function that involves multiple variables, impacting optimization procedures in machine learning. The Gram matrix plays a pivotal role in machine learning and optimization. This matrix representation captures the inner products of vectors within a set, illustrating the correlation among various data dimensions. By providing a comprehensive understanding of the dataset's geometry, the Gram matrix is an integral component in several machine learning algorithms, such as support vector machines and kernel methods. Computing the gradient using backpropagation is implemented in most modern software using automatic differentiation, which generates the neural network graph and optimizes the execution of the backpropagation algorithm. Estimating the Newton update N i.e., the second-order update is more convoluted since the Newton update scales the gradient with the inverse of the Hessian $N=(\nabla_\theta^2 \ell)^{-1}\nabla_\theta \ell$.

Further, the Sifr optimizer is the resolution of the Sifrian system in a batch setting. For feedforward neural networks, the system can be denoted as follows:

$$\begin{cases} (s1) \sum_p \Delta \sigma_{k,p} \left( \gamma_{k,p} x_{k-1,p}^T + \lambda_{k,p} x_{k-1,p}^T + 1_{k>1} \lambda_{k,p} \zeta_{k-1,p}^T \right) = 0, \\ (s2) \sum_p \nabla \sigma_{k,p} (\gamma_{k,p} + \lambda_{k,p}) = 0, \\ (s3) \; \gamma_{k,p} - 1_{k<n} W_{k+1}^T \nabla \sigma_{k+1,p} \gamma_{k+1,p} + 1_{k=n} \frac{\partial^2 \ell}{\partial x_{n,p}^2} \zeta_{n,p} + 1_{k<n} N_{k+1}^T \nabla \sigma_{k+1,p} \lambda_{k+1} = 0, \\ (s4) \; \zeta_{k,p} - 1_{k>1} \nabla \sigma_{k,p} W_k \zeta_{k-1,p} + \nabla \sigma_{k,p} (N_k x_{k-1,p} + \eta_k) = 0, \end{cases}$$

Solving the Sifrian system requires identifying multipliers $(\gamma_{k,p}, \zeta_{k,p}, N_k, \eta_k)$ that satisfy the aforementioned equations, from which the Newton update will then be informed by $(N_k, \eta_k)$.

Further, a novel explanation of each equation is provided by considering $(N_k, \eta_k)_k$ as parameters perturbation. The last equation s4, quantifies the perturbation of the neural network variables $x_{p,k}$ after introducing the new weights and biases perturbations $(-N_k, -\eta_k)_k$. The input $x_{0,p}$, is not perturbed, $x_{1,p}$ is perturbed by $\delta x_{1,p} = \zeta_{1,p}$ induced only by parameter perturbation $(N_1, \eta_1)$ of the first layer. The second layer perturbation $\delta x_{2,p}$ has two origins due to the perturbation induced by the parameters $(-N_2, -\eta_2)$ and the perturbations due to the previous layer. Essentially, these observations are summarized as $\delta x_{k,p} = \zeta_{k,p}(-N, -\eta)$. The equation s3 does the same perturbation quantification for the Lagrange multiplier i.e., $\delta \lambda_{k,p} = \gamma_{k,p}(-N, -\eta)$. The equations s1 and s2 dictate that the introduced perturbations should cancel the gradient.

Beyond the Sifrian and the R-operator, the Newton method fundamentally looks for an update that cancels the gradient. Nonetheless, upon analyzing the perturbations of the Sifrian, we identify a few missing terms. Essentially, the Newton method is a first-order perturbation of the gradient, designed to cancel it out, and it neglects any product of perturbations. Incorporating these missing products (quadratic) terms from the Sifrian is at the heart of the Sifr optimizer, providing a critical breakthrough in addressing the elusive batch case. The cancellation of the gradient is expressed as follows:

$$\begin{cases} \nabla_{W_k - N_k} \ell = -\sum_p \nabla \sigma_{k,p} (\lambda_{k,p} + \delta \lambda_{k,p})(x_{k-1,p} + \delta x_{k-1,p})^T = 0, \\ \nabla_{\beta_k - \eta_k} \ell = -\sum_p \nabla \sigma_{k,p} (\lambda_{k,p} + \delta \lambda_{k,p}) = 0, \end{cases}$$

The activation function is presumed to be piecewise linear, although a comprehensive development for $C^2$ activation functions also be developed. Using the results of the perturbation analysis $\delta x_{k,p} = \zeta_{k,p}(-N, -\eta)$ and $\delta \lambda_{k,p} = \gamma_{k,p}(-N, -\eta)$, the following equation is obtained:

$$\begin{cases} (s1e) \; \nabla_{W_k - N_k} \ell = -\sum_p \nabla \sigma_{k,p} \left( \lambda_{k,p} x_{k-1,p}^T + \gamma_{k,p} x_{k-1,p}^T + 1_{k>1} \lambda_{k,p} \zeta_{k-1,p}^T + \underbrace{1_{k>1} \gamma_{k,p} \zeta_{k-1,p}^T}_{\text{missing term}} \right) = 0, \\ (s2e) \; \nabla_{\beta_k - \eta_k} \ell = -\sum_p \nabla \sigma_{k,p} (\lambda_{k,p} + \delta \lambda_{k,p}) = 0, \end{cases}$$

The term absent from the preceding equation was neglected as it represents a second-order perturbation of the gradient, which should not be incorporated in the Newton method. The introduction of this term signifies a distinctive divergence of the Sifr optimizer from the traditional Newton method. Correspondingly, including the previously omitted terms (now underlined) from equations s3 and s4 results in:

$$\begin{cases} (s3e) \; \gamma_{k,p} - 1_{k<n} W_{k+1}^T \nabla \sigma_{k+1,p} \gamma_{k+1,p} + 1_{k=n} \frac{\partial^2 \ell}{\partial x_{n,p}^2} \zeta_{n,p} + 1_{k<n} N_{k+1}^T \nabla \sigma_{k+1,p} \left( \lambda_{k+1,p} + \underline{\gamma_{k+1,p}} \right) = 0 \\ (s4e) \; \zeta_{k,p} - 1_{k>1} \nabla \sigma_{k,p} W_k \zeta_{k-1,p} + \nabla \sigma_{k,p} (N_k (x_{k-1,p} + \underline{\zeta_{k-1,p}}) + \eta_k) = 0, \end{cases}$$

Solving the extended Sifrian system (s1e, s2e, s3e, and s4e) is the foundation of the Sifr optimizer. Creating a perturbation of the adjoint that cancels the adjoint itself, i.e., $(\lambda_{k,p} + \delta \lambda_{k,p}) = 0$, solves immediately the three first equations (s1e, s2e, and s3e) and yields the following reduced system, which is called the pivotal Sifr equation:

$$\begin{cases} \frac{\partial^2 \ell}{\partial x_{n,p}^2} \zeta_{n,p} = -\frac{\partial \ell}{\partial x_{n,p}}, \\ \zeta_{k,p} - 1_{k>1} \nabla \sigma_{k,p} W_k \zeta_{k-1,p} + \nabla \sigma_{k,p} (N_k (x_{k-1,p} + \zeta_{k-1,p}) + \eta_k) = 0, \end{cases}$$

Conceptually, the pivotal Sifr equation applies an exact Newton correction at the output layer only and seeks parameter perturbation that creates such a second-order correction at the last layer. If the second-order parameter perturbation is designated as, $\delta \theta = [N, \eta]$ then in essence The Sifr equation can be stated as follows:

$$\begin{cases} \frac{\partial^2 l}{\partial x_{n,p}^2} \zeta_{n,p} = -\frac{\partial \ell}{\partial x_{n,p}}, \\ \zeta_{n,p} = \left( \frac{d x_{n,p}}{d \theta} \right)^T_{\theta - \delta \theta} S, \end{cases}$$

Another feasible modification involves enforcing the convexity correction explicitly at the output layer, which provides a more condensed formula $$\left(\left(\frac{\partial \ell}{\partial \theta}\right)^T S = \left(\frac{\partial \ell}{\partial x_n}\right)\left(\frac{\partial^2 \ell}{\partial x_n^2}\right)^{-1}\left(\frac{\partial \ell}{\partial x_n}\right) + \epsilon\right).$$

This results in an explicit exact Newton update at the final layer:

$$\left(\frac{dx_{n,p}}{d\theta}\right)^T_{\theta-\delta\theta} S = -\left(\frac{\partial^2 \ell}{\partial x_{n,p}^2}\right)^{-1} \frac{\partial \ell}{\partial x_{n,p}}$$

The quadratic nature of the pivotal Sifr equation, specifically due to the term $N_k \zeta_{k-1,p}$, renders it incompatible with linear solvers. If this quadratic term is ignored and the resulting equation is multiplied by the Jacobian from the right then the Gauss-Newton system is obtained. This step corroborates the pioneering theoretical development underpinning the Sifr optimizer. Notably, both Gauss-Newton and Sifr methodologies address the convexity challenge associated with the Newton method. However, where Gauss-Newton employs truncation, the Sifr optimizer uses the inclusion of high-order terms. Additionally, the Gauss-Newton system typically overshadows the disclosed method in terms of size and computational requirements. The Sifr equation, by reducing the dimensionality of inversion, lays the groundwork for superior performance. The Sifr equation introduces a rectangular system, which can be exploited to solve the problem in a least squares sense. By making an abstraction of the sample p, the following equation is derived:

$$\frac{\partial^2 \ell}{\partial x_n^2}\left(\frac{dx_{n,p}}{d\theta}\right)^T_\theta S = \frac{\partial \ell}{\partial x_n} + \varepsilon,$$

Here, $\varepsilon$ represents a standard Gaussian error term common in ordinary least squares regression $Ax=b+\varepsilon$, where $b$ and $\varepsilon$ are typically assumed to be independent. Small-scale neural networks could feasibly execute a direct resolution. Alternatively, the Conjugate Gradient Least Squares (CGLS) method would also be an appropriate selection. For a greater performance, a 'natural sketch' is proposed that involves multiplying the regression equation by $$\left(\frac{\partial \ell}{\partial x_n}\right)^T,$$

yielding the primary equation that needs to be solved:

$$\left(\frac{d\tilde{\ell}}{d\theta}\right)^T S = \left(\frac{\partial \ell}{\partial x_n}\right)^T \frac{\partial \ell}{\partial x_n} + \epsilon,$$

If the matrix of convexity corrected gradient $$\left(\frac{d\tilde{\ell}}{d\theta}\right)$$

is full rank, it would possess a right inverse, which allows the Sifr update to be expressed as:

$$S = \frac{d\tilde{\ell}}{d\theta}\left(\left(\frac{d\tilde{\ell}}{d\theta}\right)^T \frac{d\tilde{\ell}}{d\theta}\right)^{-1}\left(\frac{\partial \ell}{\partial x_n}\right)^T \frac{\partial \ell}{\partial x_n} = \frac{d\tilde{\ell}}{d\theta} v$$

Essentially the complex term $$\left(\left(\frac{d\tilde{\ell}}{d\theta}\right)^T \frac{d\tilde{\ell}}{d\theta}\right)^{-1}\left(\frac{\partial \ell}{\partial x_n}\right)^T \frac{\partial \ell}{\partial x_n}$$

can be reduced to a vector that can be called v. Thus, the quest for the Sifr update could be recast using a Gram matrix $$\left(\frac{d\tilde{\ell}}{d\theta}\right)^T \frac{d\tilde{\ell}}{d\theta}$$

as shown below:

$$\left(\frac{d\tilde{\ell}}{d\theta}\right)^T \underbrace{\frac{\partial \tilde{\ell}}{\partial \theta} v}_{\text{Sifr update}} = \left(\frac{\partial \ell}{\partial x_n}\right)^T \frac{\partial \ell}{\partial x_n},$$

The dimensionality of the problem is significantly reduced from the size of $\theta$ (ranging from millions to billions) to the size of v (typically within the hundreds: 64~512). The acceleration of the Sifr optimizer is attributed to this considerable reduction in dimensionality. A variety of methods may be applied for estimating the Gram matrix and conducting the inversion, either directly or iteratively, with or without preconditioning, in an appropriate manner.

Further, a dimensionally reduced version of the Sifr equation, leading to a scalar quantity on the left-hand side is derived. Further, the derivation is as follows:

$$\left(\frac{\partial \ell}{\partial \theta}\right)^T = \left(\frac{\partial \ell}{\partial x_n}\right)^T\left(\frac{\partial x_n}{\partial \theta}\right)^T,$$

Gradient Chain Rule (Transposed)
Multiplying $$\left(\frac{\partial \ell}{\partial x_n}\right)^T$$

to the Sifr equation $$\left(\left(\frac{\partial x_n}{\partial \theta}\right)^T S = \left(\frac{\partial^2 \ell}{\partial x_n^2}\right)^{-1}\left(\frac{\partial \ell}{\partial x_n}\right) + \epsilon\right)\left(\frac{\partial \ell}{\partial x_n}\right)^T \times \left(\left(\frac{\partial x_n}{\partial \theta}\right)^T S = \left(\frac{\partial^2 \ell}{\partial x_n^2}\right)^{-1}\left(\frac{\partial \ell}{\partial x_n}\right) + \epsilon\right)$$

Obtaining the dimensionally reduced Sifr equation based on the Multiplication:

$$\left(\frac{\partial \ell}{\partial \theta}\right)^T S = \left(\frac{\partial \ell}{\partial x_n}\right)^T\left(\frac{\partial^2 \ell}{\partial x_n^2}\right)^{-1}\left(\frac{\partial \ell}{\partial x_n}\right) + \epsilon$$

Further, this derivation process is called natural sketching as it makes quantities similar to the empirical Fisher matrix of the natural gradient method appear. A convexity correction term in the dimensionally reduced Sifr equation sets apart the Sifr sketched equation (dimensionally reduced Sifr equation) from the natural gradient method. The resolution of this sketched equation is designed for lower computational resource consumption, thus increasing efficiency in system performance. The descriptor "natural" is adopted due to the sketching's introduction of terms reminiscent of the natural gradient method on the right-hand side of the pivotal Sifr equation. Despite these modifications, the left-hand side of the Sifr pivotal equation maintains its uniqueness, distinguishing it from preceding methodologies. The iterative method employed can take various forms, including but not limited to, conjugate gradient with or without preconditioning. This specific application of the Sifr optimizer sharply contrasts with prior conjugate-gradient based Hessian-free optimizations, which necessitated iterations on the order of the model parameters—potentially reaching millions or billions. In a novel departure, the iterative version of the Sifr optimizer needs a number of iterations lesser than the batch size, enhancing computational efficiency. The versatility of this version of the Sifr optimizer lies in its adaptability to diverse optimization scenarios. For example, it can effectively support extensive datasets while ensuring minimal utilization of computational resources. It delivers a manageable optimization solution. This optimizes system resources, making it the optimizer of choice for demanding neural network training processes, and substantially pushing the boundaries of current Hessian-free optimization methods.

Further, the Sifr equation $$\left(\left(\frac{\partial x_n}{\partial \theta}\right)^T S = \left(\frac{\partial^2 \ell}{\partial x_n^2}\right)^{-1}\left(\frac{\partial \ell}{\partial x_n}\right) + \epsilon\right)$$

uniquely depart from the Newton equation $$\frac{\partial^2 \ell}{\partial \theta^2} = \frac{\partial \ell}{\partial d\theta}.$$

The Sifr equation adopts the ordinary least squares format, thus incorporating an error term, denoted as epsilon. In line with standard practices in the least squares regression, this error term is assumed to represent an isotropic centered Gaussian variable. This pivotal Sifrian equation (Sifr equation) essentially discerns the parameter perturbations that yield an exact Newton update at the output layer, indicating a distinct conceptual departure from standard Newton methods. Despite its transformative potential, directly solving the Sifrian pivotal equation could be computationally demanding due to its complexity. Notably, the Sifr Equation features a unique left-hand term, corresponding to the Newton step executed at the output layer preceding the loss computation. This special term is a defining characteristic that sets the Sifr optimizer apart from its counterparts.

Further, the present disclosure describes the 'Sifr optimizer', which is a novel solution for enhancing the training process in various types of neural networks, embodied in methods, systems, and computer-readable media for the aforementioned purposes. The optimizer builds upon the Sifrian system—a unified functional that merges the forward pass, backpropagation, and gradient update of neural network training. The Sifr optimizer provides an innovative resolution to the Sifrian system tailored for batch training scenarios, which is a crucial advancement in optimization for machine learning. This resolution to the Sifrian system yields an efficient second-order update of model parameters, leading to faster convergence and improved training performance. Despite the underlying mathematical complexity, the Sifr optimizer maintains practical computational demands, making it suitable for diverse machine learning scenarios. The Sifr optimizer offers substantial potential to enrich learning speed, efficiency, and convergence in a broad spectrum of applications within artificial intelligence, machine learning, and data science fields.

Further, the present disclosure describes an efficient second-order neural network learning using a Sifr optimizer.

FIG. 1 is an illustration of an online platform 100 consistent with various embodiments of the present disclosure. By way of non-limiting example, the online platform 100 to train a neural network model may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 2000.

Figure 2:
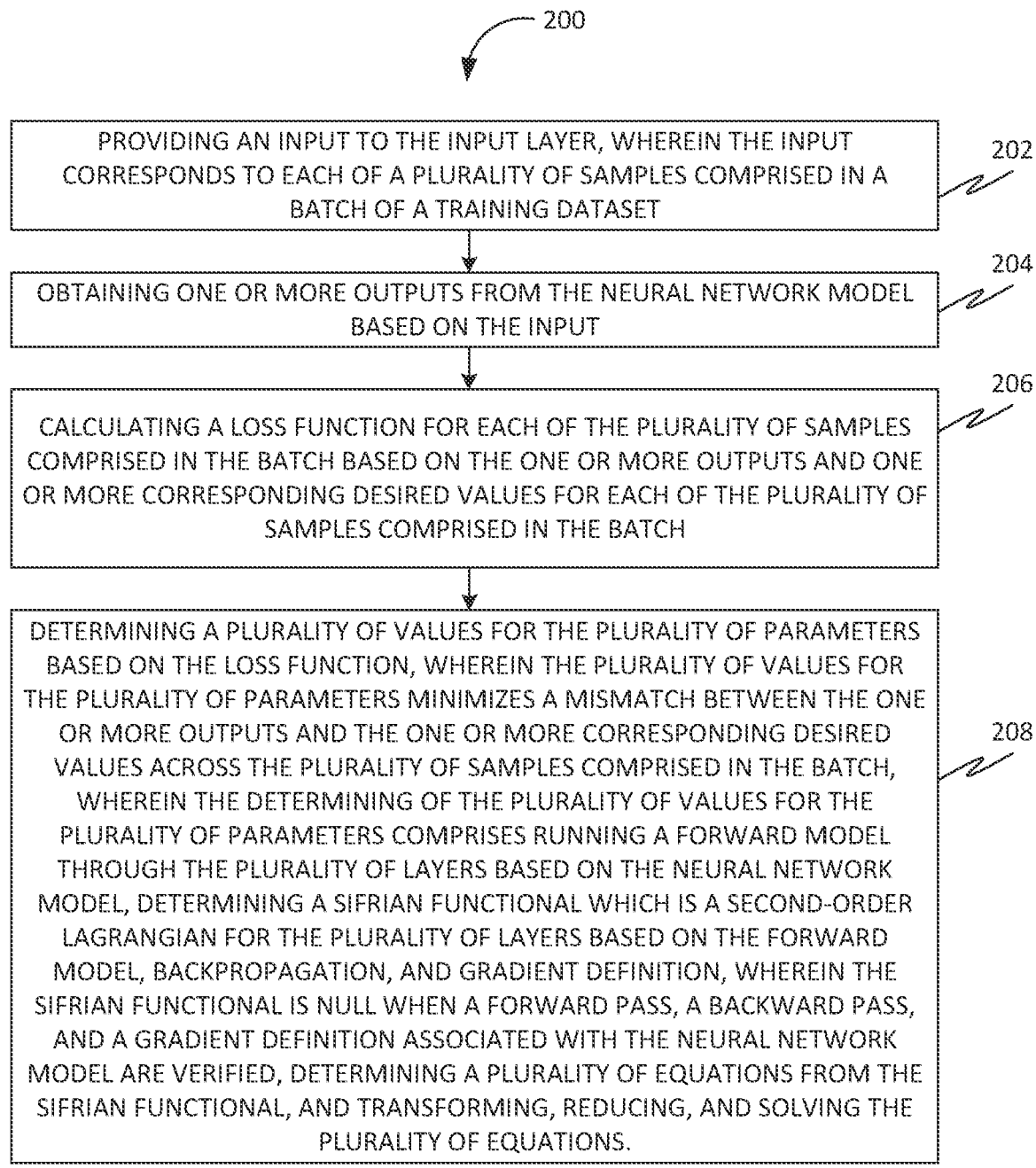
FIG. 2 is a flowchart of a method 200 for training a neural network model having a plurality of layers comprising an input layer, at least one middle layer, an output layer, and a plurality of parameters, in accordance with some embodiments.

FIG. 2 is a flowchart of a method 200 for training a neural network model having a plurality of layers comprising an input layer, at least one middle layer, one or more output layers, and a plurality of parameters commonly referred to as weights and biases, in accordance with some embodiments. Further, the neural network model may be a neural network. Further, the neural network model may be associated with a neural network architecture. Further, the at least one middle layer may be a hidden layer. Further, the plurality of parameters may include weights and biases. Further, the plurality of parameters may include weight matrices and bias vectors.

Accordingly, at 202, the method 200 may include providing an input to the input layer. Further, the input corresponds to each of a plurality of samples comprised in a batch of a training dataset.

Further, at 204, the method 200 may include obtaining one or more outputs from the neural network model based on the input. Further, in an embodiment, the one or more outputs may be obtained at the one or more output layers. Further, in an embodiment, the one or more outputs may be obtained at one or more of the input layer, the at least one middle layer, and the one or more output layers corresponding to the input.

Further, at 206, the method 200 may include calculating a loss function for each of the plurality of samples comprised in the batch based on the one or more outputs and one or more corresponding desired values for each of the plurality of samples comprised in the batch. Further, the one or more corresponding desired values may include one or more desired outputs for each of the plurality of samples.

Further, at 208, the method 200 may include determining a plurality of values for the plurality of parameters based on the loss function. Further, the determining of the plurality of values for the plurality of parameters may be determining a plurality of optimal values for the plurality of parameters. Further, the plurality of values for the plurality of parameters minimizes a mismatch between the one or more outputs and the one or more corresponding desired values across the plurality of samples comprised in the batch. Further, the determining of the plurality of values for the plurality of parameters may include running a forward model through the plurality of layers based on the neural network model. Further, the forward model is determined based on the neural network architecture of the neural network model. Further, the determining of the plurality of values for the plurality of parameters may include determining a Sifrian functional which is a second-order Lagrangian (or Lagrangian) for the plurality of layers based on the forward model, backpropagation, and gradient definition. Further, the determining of the Sifrian functional may be based on the loss function. Further, the Sifrian functional may be a Sifrian system. Further, the Sifrian functional may be null when a forward pass, a backward pass, and a gradient definition associated with the neural network model may be verified. Further, the determining of the plurality of values for the plurality of parameters may include determining a plurality of equations from the Sifrian functional. Further, the plurality of equations may be Sifrian system of equations, Sifrian equations, Sifr system, Sifr equation, etc. Further, the determining of the plurality of values for the plurality of parameters may include transforming, reducing, and solving the plurality of equations. Further, the solving of the Sifrian system includes various strategies, including but not limited to a convexity correction, damping, dimensionality reduction, and direct or iterative solving.

Further, in an embodiment, the solving of the plurality of equations may include employing a plurality of solving methods. Further, the plurality of solving methods may include convexity correction, damping, dimensionality reduction, and both direct and iterative solving methods. Further, the convexity correction may be implicitly accounted for as the Sifr optimizer ensures a descent direction. Further, the damping involves an addition of an epsilon-scaled identity matrix to circumvent issues with non-invertible matrices. Further, the damping may include adding e*I to the equations. Further, the dimensionality reduction may be achieved by pre-multiplying both sides of the Sifr equation (a plurality of equations) with a matrix and solving, a common technique in large-scale problems.

Further, in some embodiments, the Sifrian functional integrates the forward pass, the backward pass, and the gradient definition for the neural network model.

Further, in some embodiments, the determining of the Sifrian functional may include excluding the loss function from the Sifrian functional and including a plurality of second-order adjoint variables in the Sifrian functional.

Further, in an embodiment, the determining of the plurality of equations may include determining a characterization of at least a second-order update for the neural network model via at least one of the plurality of second-order adjoint variables.

Figure 3:
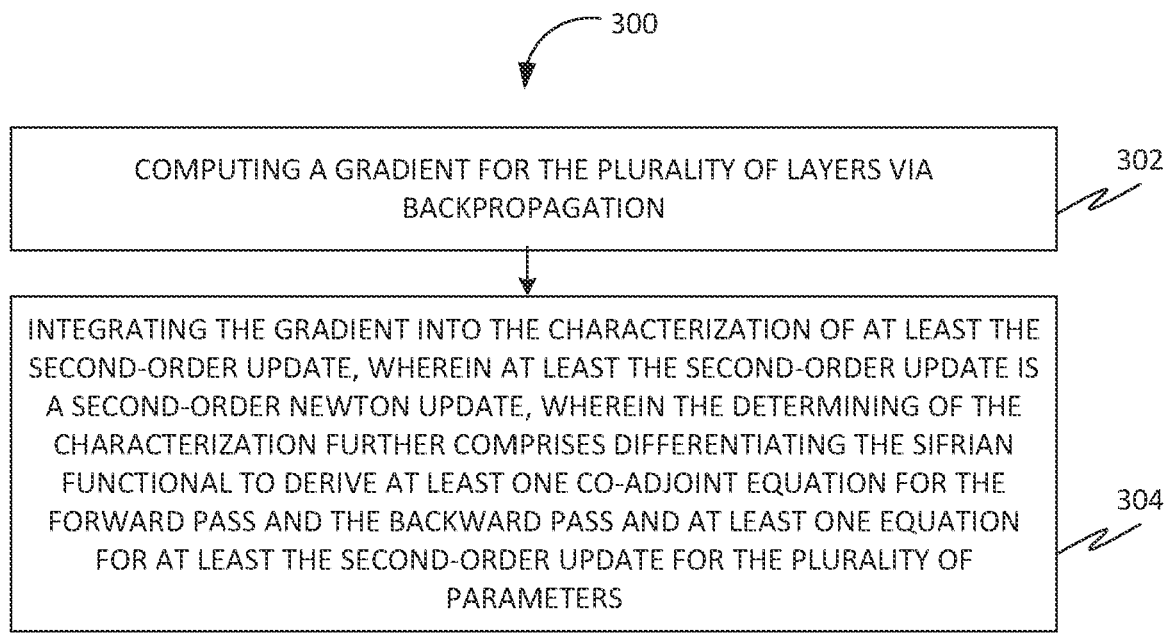
FIG. 3 is a flowchart of a method 300 for determining the plurality of values for the plurality of parameters for the training of the neural network model, in accordance with some embodiments.

FIG. 3 is a flowchart of a method 300 for determining the plurality of values for the plurality of parameters for the training of the neural network model, in accordance with some embodiments. Further, at 302, the method 300 may include computing a gradient for the plurality of layers via backpropagation.

Further, at 304, the method 300 may include integrating the gradient into the characterization of at least the second-order update. Further, at least the second-order update may be a second-order Newton update. Further, the determining of the characterization further may include differentiating the Sifrian functional to derive at least one co-adjoint equation for the forward pass and the backward pass and at least one equation for at least the second-order update for the plurality of parameters. Further, the plurality of equations may include the at least one co-adjoint equation and the at least one equation for at least the second-order update for the plurality of parameters.

Figure 4:
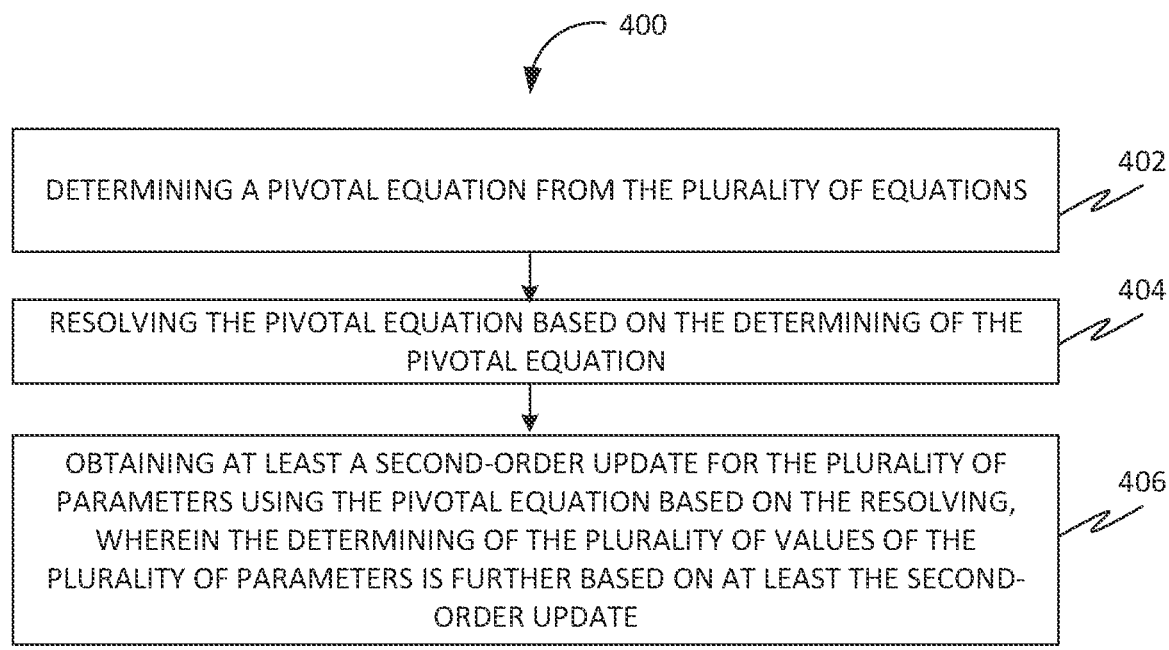
FIG. 4 is a flowchart of a method 400 for solving the plurality of equations for the training of the neural network model, in accordance with some embodiments.

FIG. 4 is a flowchart of a method 400 for solving the plurality of equations for the training of the neural network model, in accordance with some embodiments. Further, the solving of the plurality of equations may include allowing transformations. Further, at 402, the method 400 may include determining a pivotal equation from the plurality of equations. Further, the pivotal equation may be a singular pivotal equation, a Sifr pivotal equation, a Sifrian pivotal equation, a pivotal Sifr equation, etc.

Further, at 404, the method 400 may include resolving the pivotal equation based on the determining of the pivotal equation.

Further, at 406, the method 400 may include obtaining at least a second-order update for the plurality of parameters using the pivotal equation based on the resolving. Further, the determining of the plurality of values of the plurality of parameters may be further based on at least the second-order update. Further, the obtaining of at least the second-order update may include solving the pivotal equation to estimate at least the second-order update. Further, at least the second-order update may be used for training the neural network model.

Further, in some embodiments, the pivotal equation may include a damping term to handle potential ill-conditioning of the pivotal equation.

Figure 5:
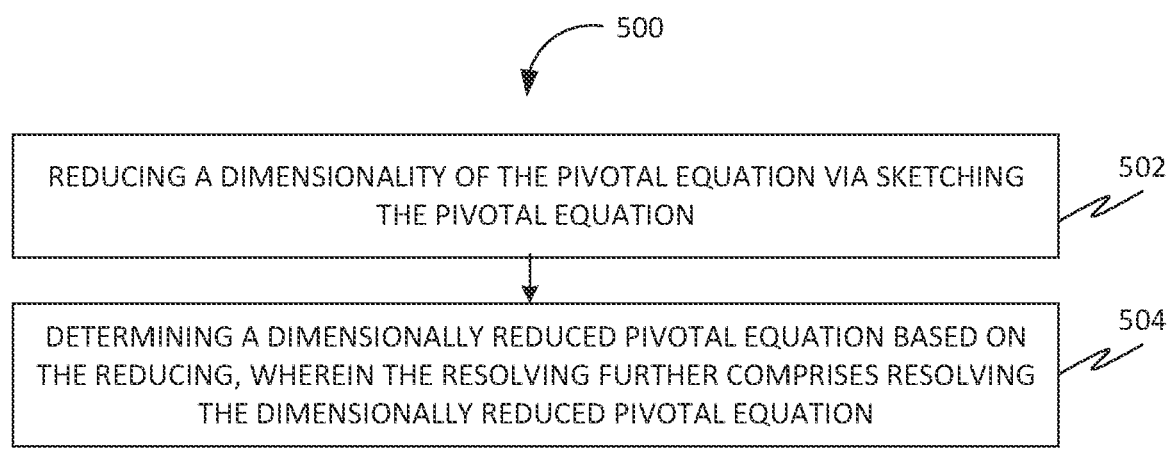
FIG. 5 is a flowchart of a method 500 for solving the plurality of equations for the training of the neural network model, in accordance with some embodiments.

FIG. 5 is a flowchart of a method 500 for solving the plurality of equations for the training of the neural network model, in accordance with some embodiments. Further, at 502, the method 500 may include reducing a dimensionality of the pivotal equation via sketching the pivotal equation. Further, the sketching may include a natural sketching.

Further, at 504, the method 500 may include determining a dimensionally reduced pivotal equation based on the reducing. Further, the resolving may include resolving the dimensionally reduced pivotal equation. Further, the dimensionally reduced pivotal equation may be a dimensionally reduced singular pivotal equation.

Further, in some embodiments, the dimensionally reduced pivotal equation may be $$\left(\frac{\partial \ell}{\partial \theta}\right)^T S = \left(\frac{\partial \ell}{\partial x_n}\right)^T \left(\frac{\partial^2 \ell}{\partial x_n^2}\right)^{-1} \left(\frac{\partial \ell}{\partial x_n}\right) + \epsilon.$$

Figure 6:
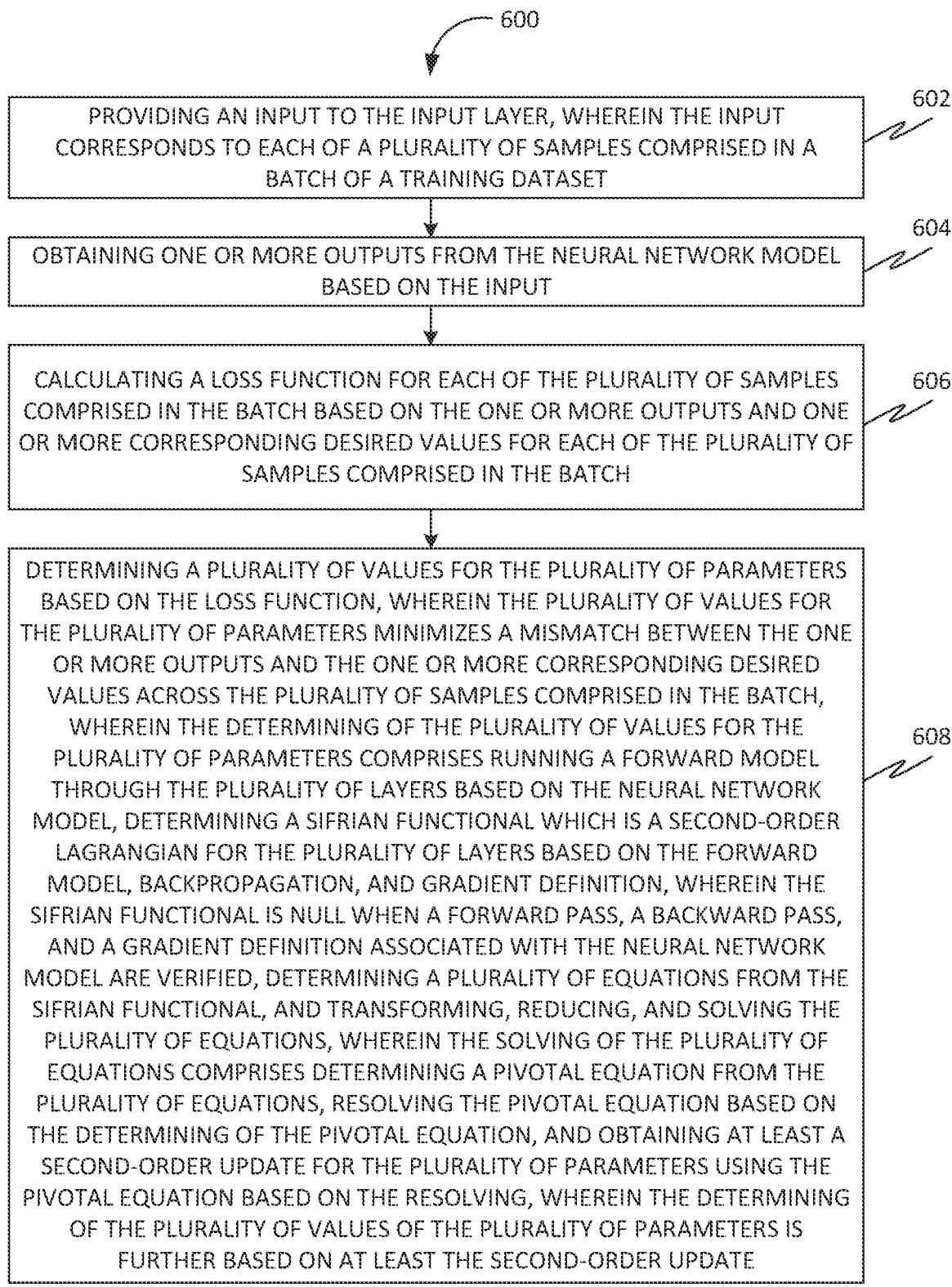
FIG. 6 is a flowchart of a method 600 for training a neural network model having a plurality of layers comprising an input layer, at least one middle layer, an output layer, and a plurality of parameters, in accordance with some embodiments.

FIG. 6 is a flowchart of a method 600 for training a neural network model having a plurality of layers comprising an input layer, at least one middle layer, one or more output layers, and a plurality of parameters commonly referred to as weights and biases, in accordance with some embodiments. Accordingly, at 602, the method 600 may include providing an input to the input layer. Further, the input corresponds to each of a plurality of samples comprised in a batch of a training dataset.

Further, at 604, the method 600 may include obtaining one or more outputs from the neural network model based on the input.

Further, at 606, the method 600 may include calculating a loss function for each of the plurality of samples comprised in the batch based on the one or more outputs and one or more corresponding desired values for each of the plurality of samples comprised in the batch.

Further, at 608, the method 600 may include determining a plurality of values for the plurality of parameters based on the loss function. Further, the plurality of values for the plurality of parameters minimizes a mismatch between the one or more outputs and the one or more corresponding desired values across the plurality of samples comprised in the batch. Further, the determining of the plurality of values for the plurality of parameters may include running a forward model through the plurality of layers based on the neural network model. Further, the determining of the plurality of values for the plurality of parameters may include determining a Sifrian functional which is a second-order Lagrangian for the plurality of layers based on the forward model backpropagation, and gradient definition. Further, the Sifrian functional may be null when a forward pass, a backward pass, and a gradient definition associated with the neural network model may be verified. Further, the determining of the plurality of values for the plurality of parameters may include determining a plurality of equations from the Sifrian functional. Further, the determining of the plurality of values for the plurality of parameters may include transforming, reducing, and solving the plurality of equations. Further, the solving of the plurality of equations may include determining a pivotal equation from the plurality of equations. Further, the solving of the plurality of equations may include resolving the pivotal equation based on the determining of the pivotal equation. Further, the solving of the plurality of equations may include obtaining at least a second-order update for the plurality of parameters using the pivotal equation based on the resolving. Further, the determining of the plurality of values of the plurality of parameters may be further based on at least the second-order update.

Further, in some embodiments, the Sifrian functional integrates the forward pass, the backward pass, and the gradient definition for the neural network model.

Figure 7:
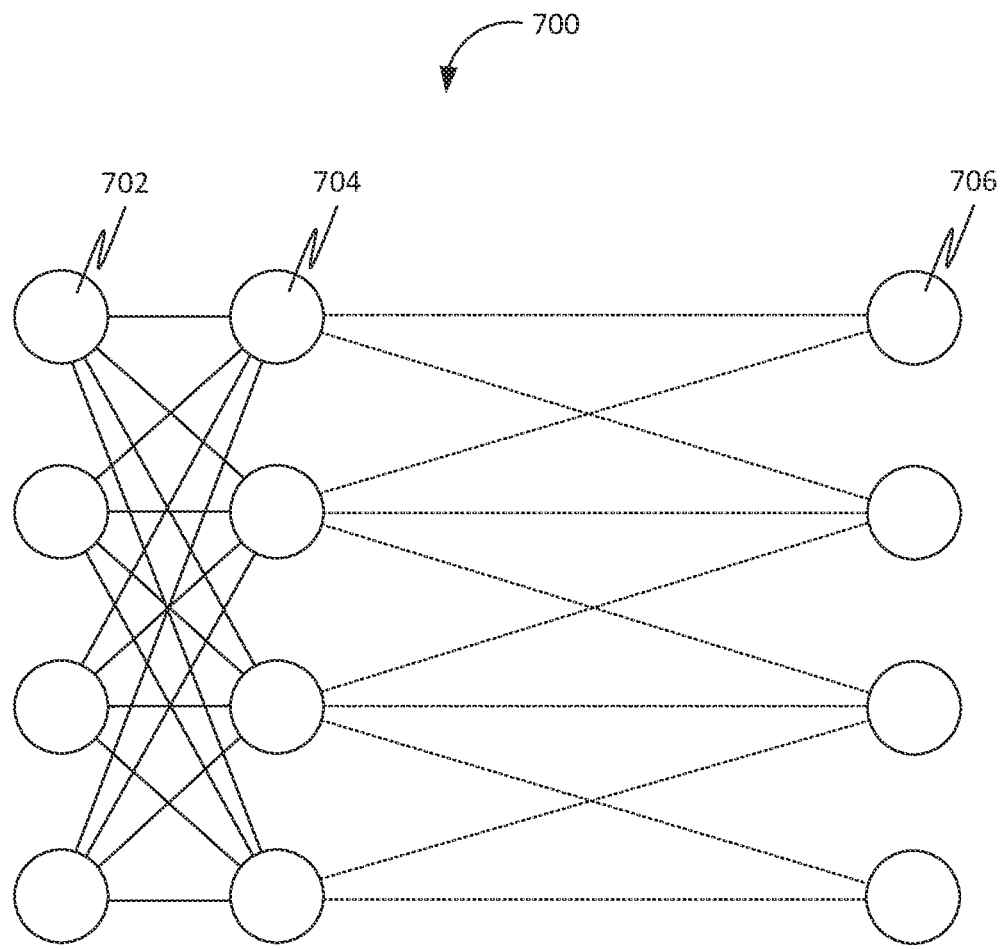
FIG. 7 illustrates a neural network model 700 comprising a plurality of layers 702-706 comprising an input layer 702, at least one middle layer 704, an output layer 706, and a plurality of parameters, in accordance with some embodiments.

FIG. 7 illustrates a neural network model 700 comprising a plurality of layers 702-706 comprising an input layer 702, at least one middle layer 704, one or more output layers 706, and a plurality of parameters commonly referred to as weights and biases, in accordance with some embodiments. Further, the neural network model 700 may be trained using a method. Further, the method may include a step of providing an input to the input layer 702. Further, the input corresponds to each of a plurality of samples comprised in a batch of a training dataset. Further, the method may include a step of obtaining one or more outputs from the neural network model 700 based on the input. Further, the method may include a step of calculating a loss function for each of the plurality of samples comprised in the batch based on the one or more outputs and one or more corresponding desired values for each of the plurality of samples comprised in the batch. Further, the method may include a step of determining a plurality of values for the plurality of parameters based on the loss function. Further, the plurality of values for the plurality of parameters minimizes a mismatch between the one or more outputs and the one or more corresponding desired values across the plurality of samples comprised in the batch. Further, the determining of the plurality of values for the plurality of parameters may include running a forward model through the plurality of layers 702-706 based on the neural network model 700. Further, the determining of the plurality of values for the plurality of parameters may include determining a Sifrian functional which is a second-order Lagrangian for the plurality of layers 702-706 based on the forward model, backpropagation, and gradient definition. Further, the Sifrian functional may be null when a forward pass, a backward pass, and a gradient definition associated with the neural network model 700 may be verified. Further, the determining of the plurality of values for the plurality of parameters may include determining a plurality of equations from the Sifrian functional. Further, the determining of the plurality of values for the plurality of parameters may include transforming, reducing, and solving the plurality of equations.

Further, in some embodiments, the Sifrian functional integrates the forward pass, the backward pass, and the gradient definition for the neural network model 700.

Further, in some embodiments, the determining of the Sifrian functional may include excluding the loss function from the Sifrian functional and including a plurality of second-order adjoint variables in the Sifrian functional.

Further, in an embodiment, the determining of the plurality of equations may include determining a characterization of at least a second-order update for the neural network model 700 by selecting at least one of the plurality of second-order adjoint variables.

Further, in an embodiment, the determining of the plurality of values for the plurality of parameters may include computing a gradient for the plurality of layers 702-706 via backpropagation. Further, the determining of the plurality of values for the plurality of parameters may include integrating the gradient into the characterization of at least the second-order update. Further, at least the second-order update may be a second-order Newton update. Further, the determining of the characterization further may include differentiating the Sifrian functional to derive at least one co-adjoint equation for the forward pass and the backward pass and at least one equation for at least the second-order update for the plurality of parameters.

Further, in some embodiments, the solving of the plurality of equations may include allowing transformations. Further, the solving of the plurality of equations may include determining a pivotal equation from the plurality of equations. Further, the solving of the plurality of equations may include resolving the pivotal equation based on the determining of the pivotal equation. Further, the solving of the plurality of equations may include obtaining at least a second-order update for the plurality of parameters using the pivotal equation based on the resolving. Further, the determining of the plurality of values of the plurality of parameters may be further based on at least the second-order update.

Further, in an embodiment, the pivotal equation may include a damping term to handle potential ill-conditioning of the pivotal equation.

Further, in an embodiment, the solving of the plurality of equations may include reducing a dimensionality of the pivotal equation via sketching the pivotal equation. Further, the solving of the plurality of equations may include determining a dimensionally reduced pivotal equation based on the reducing. Further, the resolving may include resolving the dimensionally reduced pivotal equation.

Further, in an embodiment, the dimensionally reduced pivotal equation may be $$\left(\frac{\partial \ell}{d\theta}\right)^T S = \left(\frac{\partial \ell}{\partial x_n}\right)^T \left(\frac{\partial^2 \ell}{\partial x_n^2}\right)^{-1} \left(\frac{\partial \ell}{\partial x_n}\right) + \epsilon.$$

Figure 8:
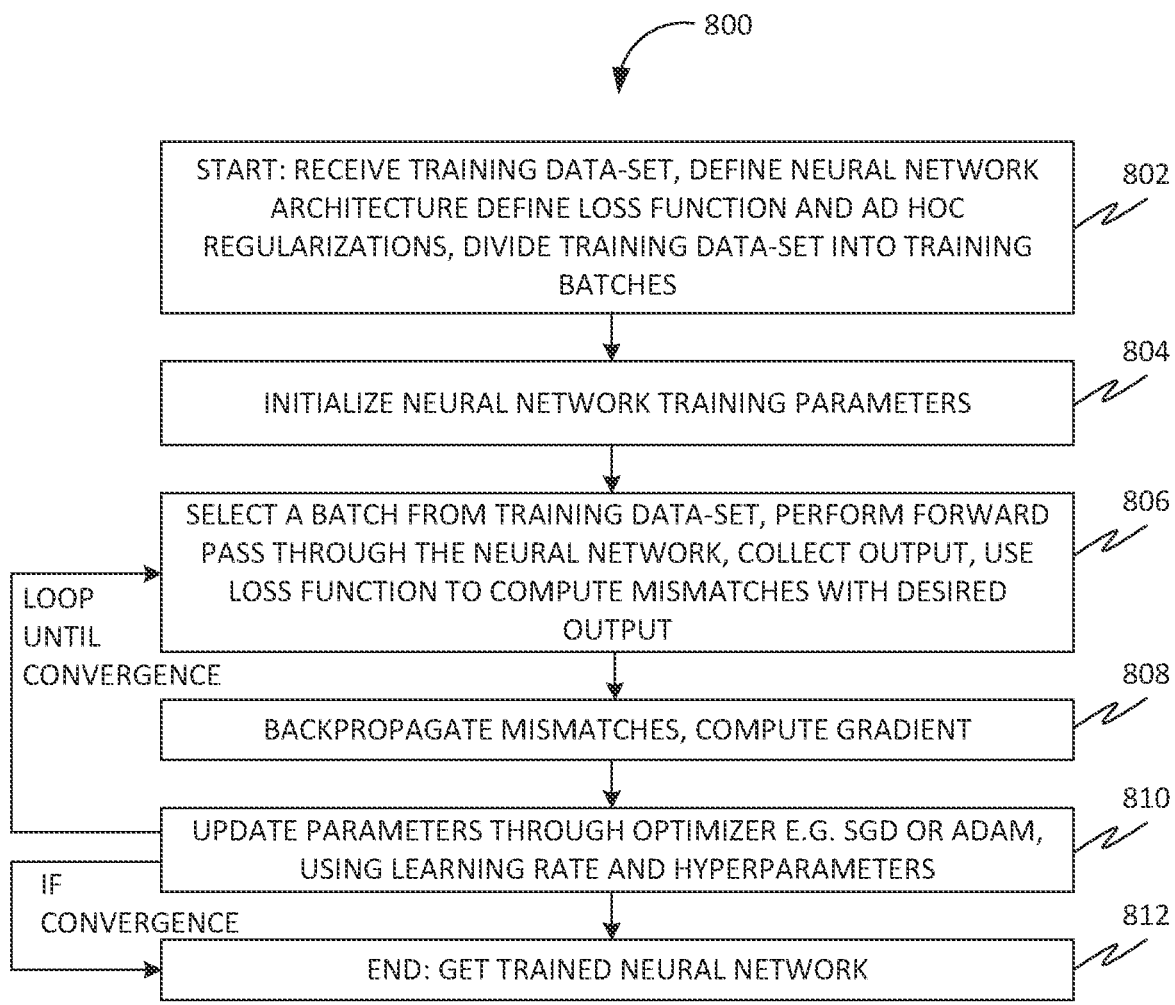
FIG. 8 is a flowchart of a method 800 for training a neural network.

FIG. 8 is a flowchart of a method 800 for training a neural network. Further, the method starts with step 802 of the method 800. Further, the step 802 of the method 800 may include receiving a training dataset, defining neural network architecture defining loss function and ad hoc regularizations, and dividing the training dataset into training batches. Further, the step 802 is followed by step 804 of the method 800. Further, the step 804 of the method 800 may include initializing neural network training parameters. Further, the step 804 is followed by step 806 of the method 800. Further, the step 806 of the method 800 may include selecting a batch from the training dataset, performing a forward pass through the neural network, collecting an output, and using a loss function to compute mismatches with a desired output. Further, the step 806 is followed by step 808 of the method 800. Further, the step 808 of the method 800 may include backpropagating the mismatches and computing a gradient. Further, the step 808 is followed by step 810 of the method 800. Further, the step 810 of the method 800 may include updating the parameters (neural network parameters) through an optimizer e.g., SGD or ADAM, using a learning rate and hyperparameters. Further, after step 810 a convergence for the neural network is determined. Further, the method 800 may include looping steps 806, 808, and 810 after the step 810 until the convergence is achieved. Further, the step 810 is followed by step 812 of the method 800 if the convergence is achieved after the step 810. Further, the method 800 ends at the step 812, and a trained neural network is obtained.

Further, the method 800 is a conventional neural network training process utilizing traditional optimizers such as Stochastic Gradient Descent (SGD) or ADAM. Further, the process includes the forward and backward propagation of data and gradients, until convergence of the training process. Further, the process describes the role of the optimizer in adjusting the neural network's weights and biases which are the neural network training parameters.

Figure 9:
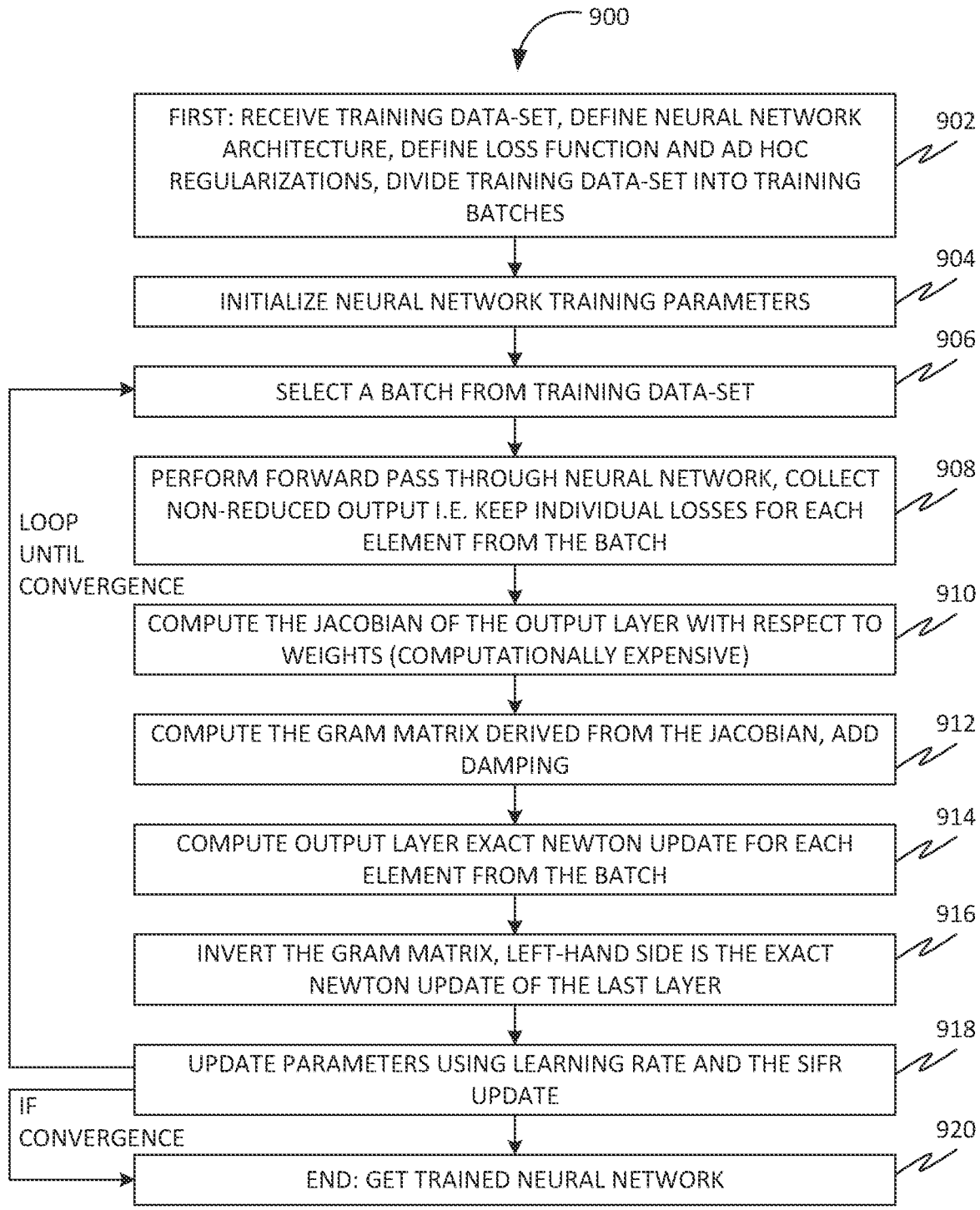
FIG. 9 is a flowchart of a method 900 for training a neural network, in accordance with some embodiments.

FIG. 9 is a flowchart of a method 900 for training a neural network, in accordance with some embodiments. Further, the method 900 starts with step 902 of the method 900. Further, the step 902 of the method 900 may include receiving a training dataset, defining a neural network architecture, defining a loss function and ad hoc regularizations, and dividing the training dataset into training batches. Further, the step 902 is followed by step 904 of the method 900. Further, the step 904 of the method 900 may include initializing neural network training parameters. Further, the step 904 is followed by step 906 of the method 900. Further, the step 906 of the method 900 may include selecting a batch from the training dataset. Further, the step 906 is followed by step 908 of the method 900. Further, the step 908 of the method 900 may include performing a forward pass through the neural network and collecting non-reduced output i.e., keeping individual losses for each element from the batch. Further, the step 908 is followed by step 910 of the method 900. Further, the step 910 of the method 900 may include computing the Jacobian of the output layer with respect to weights. Further, the computing of the Jacobian is computationally expensive. Further, the step 910 is followed by step 912 of the method 900. Further, the step 912 of the method 900 may include computing the gram matrix derived from the Jacobian and adding damping. Further, the step 912 is followed by step 914 of the method 900. Further, the step 914 of the method 900 may include computing an output layer exact newton update for each element from the batch. Further, the step 914 is followed by step 916 of the method 900. Further, the step 916 of the method 900 may include inverting the gram matrix, and the left-hand side is the exact Newton update of the last layer. Further, the step 916 is followed by step 918 of the method 900. Further, the step 918 of the method 900 may include updating parameters (such as neural network training parameters) using a learning rate and the Sifr update. Further, after step 918 a convergence for the neural network is determined. Further, the method 900 may include looping steps 906, 908, 910, 912, 914, 916, and 918 after the step 918 until the convergence is achieved. Further, the step 918 is followed by step 920 of the method 900 if the convergence is achieved after the step 918. Further, the method 900 ends at the step 920, and a trained neural network is obtained.

Further, the method 900 is a neural network training process that employs a version of the Sifr optimizer during forward pass and backward pass. Further, this version of the Sifr optimizer has a significant RAM footprint, rendering it most suitable for scenarios involving smaller-scale models and datasets, or applications with restricted batch sizes.

Figure 10:
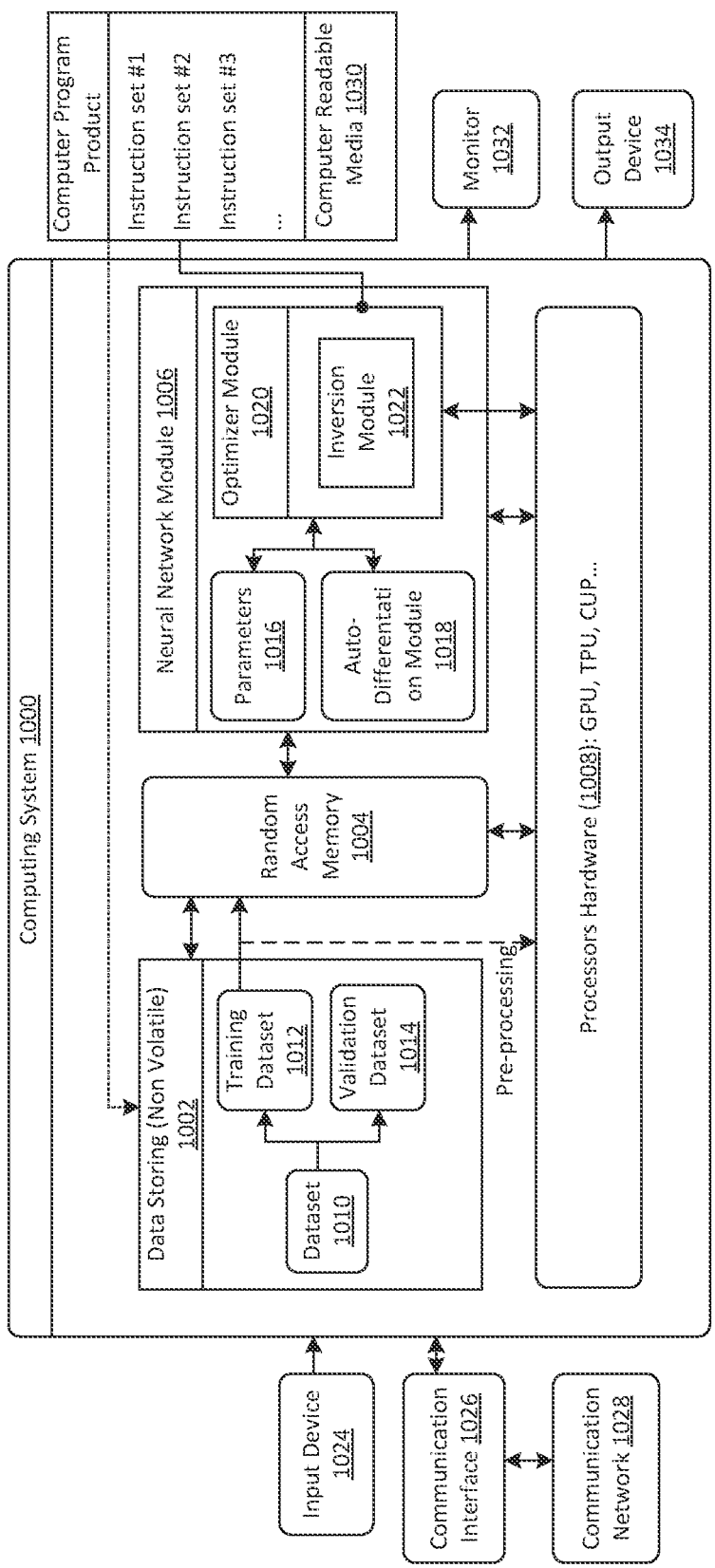
FIG. 10 is a block diagram of a computing system 1000 for training a neural network, in accordance with some embodiments.

FIG. 10 is a block diagram of a computing system 1000 for training a neural network, in accordance with some embodiments. Further, the computing system 1000 may include a data storing module (non-volatile) 1002, a random access memory 1004, a neural network module 1006, and a processor hardware 1008.

Further, the data storing module 1002 may include a dataset 1010, a training dataset 1012, and a validation dataset 1014. Further, the training dataset 1012 and the validation dataset 1014 may be associated with the dataset 1010.

Further, the neural network module 1006 may include parameters (such as weights and biases) 1016, an auto differentiation module 1018, and an optimizer module 1020 comprising an inversion module 1022. Further, the parameters 1016 and the auto differentiation module 1018 may be associated with the optimizer module 1020.

Further, the data storing module 1002, the neural network module 1006, and the processor hardware 1008 may be communicatively coupled with the random access memory 1004.

Further, the training dataset 1012 may be preprocessed using the processor hardware 1008. Further, the training dataset 1012 may be received by the random access memory 1004. Further, the optimizer module 1020 may be coupled with the processor hardware 1008.

Further, the processor hardware 1008 may include GPU, TPU, CPU, etc.

Further, the computing system 1000 may be associated with an input device 1024, a communication interface 1026, a communication network 1028, a computer readable media 1030, a monitor 1032, and an output device 1034. Further, the input device 1024, the communication interface 1026, the monitor 1032, and the output device 1034 may be communicatively coupled with the computing system 1000. Further, the communication network 1028 may be communicatively coupled with the communication interface 1026. Further, the computer readable media 1030 may include a computer program product comprising a plurality of instruction sets.

Further, the computing system 1000 is a special-purpose computing system designed to implement the Sifr Optimizer. Further, the special-purpose computing system may include hardware and software that is necessary for optimal operation of the Sifr Optimizer. The special-purpose computing system is equipped with various modules allowing for user interaction, data input, and output. special-purpose computing system houses an array of hardware processors including for example CPUs, GPUs, and TPUs. Additionally, the special-purpose computing system incorporates RAM (random access memory) and non-volatile storage units (data storing module). The neural network module within this setup incorporates an optimization module, where the Sifr Optimizer is implemented as a dedicated set of instructions, enabling efficient and enhanced neural network training.

Figure 11:
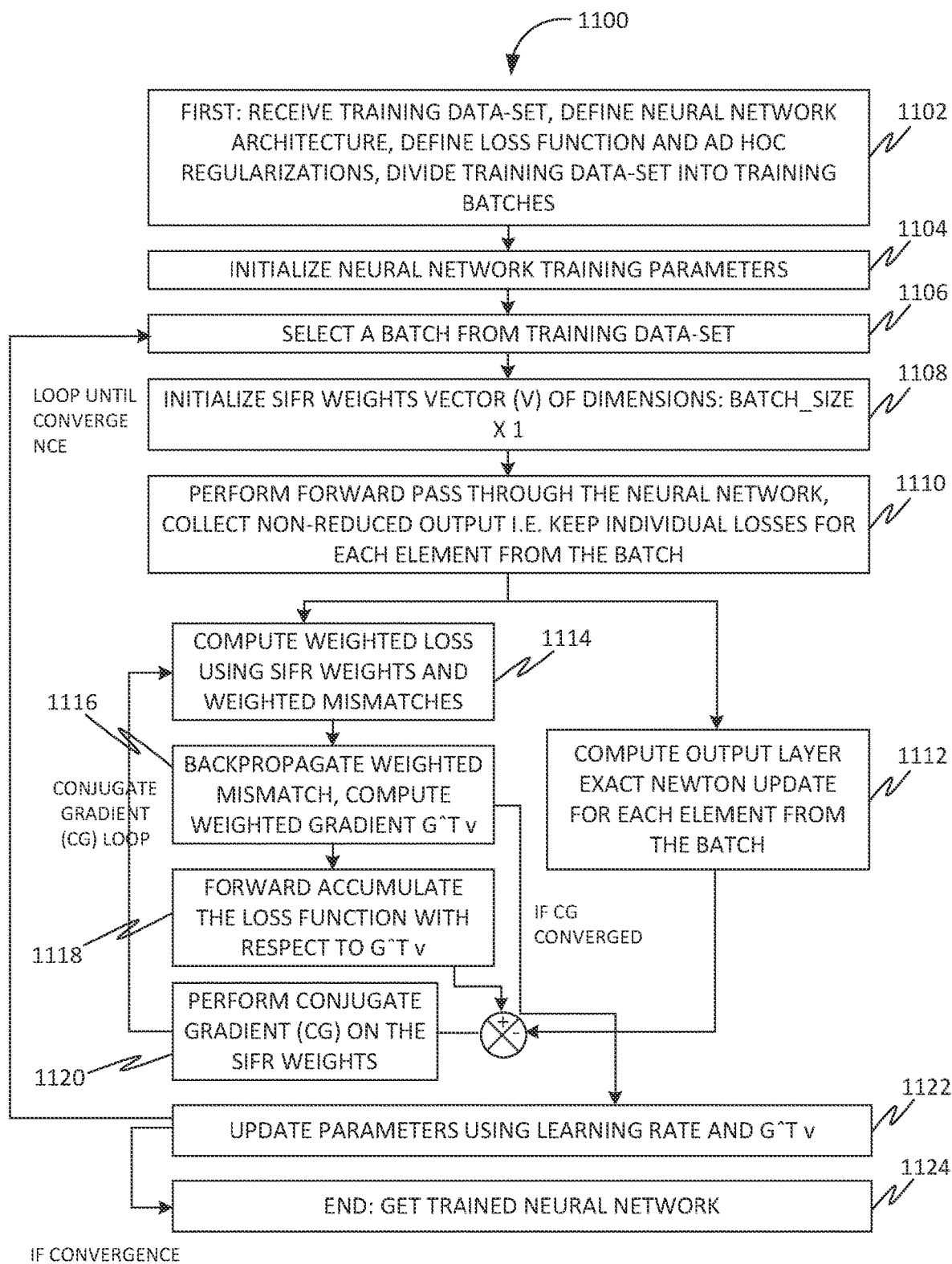
FIG. 11 is a flowchart of a method 1100 for training a neural network, in accordance with some embodiments.

FIG. 11 is a flowchart of a method 1100 for training a neural network, in accordance with some embodiments. Further, the method 1100 starts with step 1102 of the method 1100. Further, the step 1102 of the method 1100 may include receiving a training dataset, defining a neural network architecture, defining a loss function and ad hoc regularizations, and dividing the training dataset into training batches. Further, the step 1102 is followed by step 1104 of the method 1100. Further, the step 1104 of the method 1100 may include initializing neural network training parameters. Further, the step 1104 is followed by step 1106 of the method 1100. Further, the step 1106 of the method 1100 may include selecting a batch from the training dataset. Further, the step 1106 is followed by step 1108 of the method 1100. Further, the step 1108 of the method 1100 may include initializing Sifr weights vector (v) of dimensions: batch_size×1. Further, the step 1108 is followed by step 1110 of the method 1100. Further, the step 1110 of the method 1100 may include performing a forward pass through the neural network and collecting a non-reduced output i.e., keeping individual losses for each element from the batch. Further, the step 1110 is followed by steps 1112 and 1114 of the method 1100. Further, the step 1112 of the method 1100 may include computing an output layer exact newton update for each element from the batch. Further, the step 1114 of the method 1100 may include computing weighted loss using Sifr weights and weighted mismatches. Further, the step 1114 is followed by step 1116 of the method 1100. Further, the step 1116 of the method 1100 may include backpropagating weighted mismatches and computing weighted gradient $\hat{G}^T$ v. Further, the step 1116 is followed by step 1118 of the method 1100. Further, the step 1118 of the method 1100 may include forward accumulating the loss function with respect to $\hat{G}^T$ v. Further, the output layer exact Newton update is subtracted from the loss function after the steps 1112 and 1118. Further, the steps 1118 and 1112 are followed by step 1120 of the method 1100. Further, the step 1120 of the method 1100 may include performing conjugate gradient (CG) on the Sifr weights. Further, a convergence of CG is determined after the step 1116. Further, the method 1100 may include looping steps 1114, 1116, 1118, and 1120 if the convergence of CG is not achieved after the step 1116. Further, the step 1116 is followed by step 1122 if the convergence of CG is achieved. Further, the step 1122 may include updating parameters (such as neural network training parameters) using a learning rate and $\hat{G}^T$ v. Further, a convergence is determined after the step 1122. Further, the method 1100 may include looping steps 1106, 1108, 1110, 1112, 1114, 1116, 1118, 1120, and 1122 after the step 1122 if the convergence is not achieved after the step 1122. Further, the step 1122 is followed by step 1124 of the method 1100 if the convergence is achieved after the step 1122. Further, the method 1100 ends at the step 1124, and a trained neural network is obtained.

Further, the method 1100 is a neural network training process that employs a specific variant of the Sifr optimizer in neural network training. In this variant, direct inversion of the pivotal equation is avoided, saving computational resources, and making it ideal for larger models and extensive datasets. Further, the neural network training process utilizes sketching and an iterative estimation technique for efficient optimization. This iteration contrasts with previous conjugate-gradient based optimizations as it requires iterations equivalent to the batch size, not the model parameters. Further, the Sifr optimizer circumvents the direct inversion in the Sifr pivotal equation, ensuring minimal computational resource requirements and providing a conducive environment for handling large models and expansive datasets. Further, the neural network training process deploys a "natural" sketching approach for dimensionality reduction of the Sifr pivotal equation.

Figure 12:
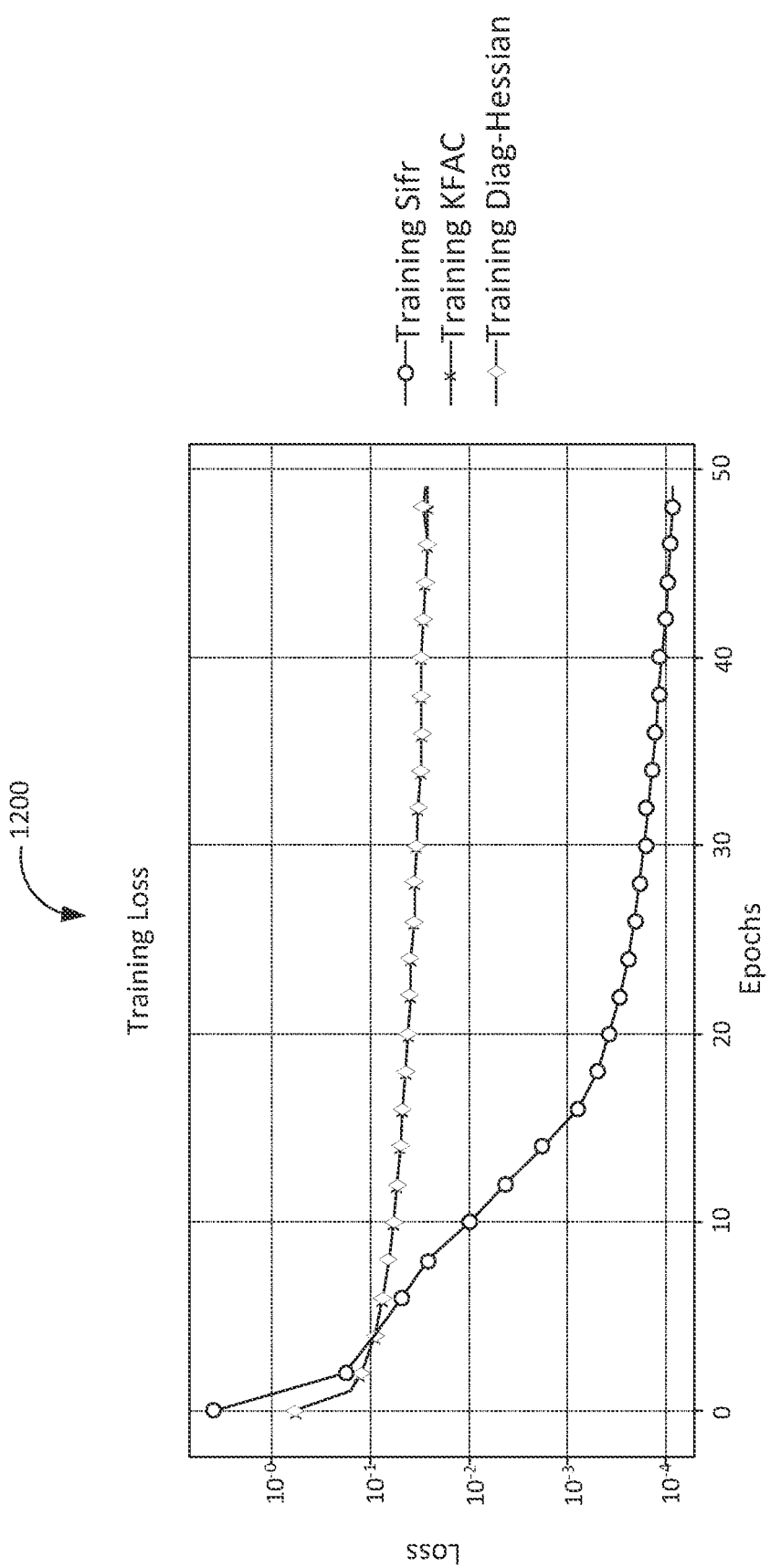
FIG. 12 is a graph 1200 of a training loss for facilitating a performance comparison of a Sifr optimizer with other second order methods for a neural network training, in accordance with some embodiments.

FIG. 12 is a graph 1200 of a training loss for facilitating a performance comparison of a Sifr optimizer with other second order methods for a neural network training, in accordance with some embodiments. Further, the other second order methods may include a KFAC and a diagonal Hessian approximation scaling. Further, the loss of the training loss is measured against epoch. Further, the comparison is drawn using the MNIST dataset with a consistent batch size of 256 and a uniform learning rate of 0.1 which is applied across all methods.

Figure 13:
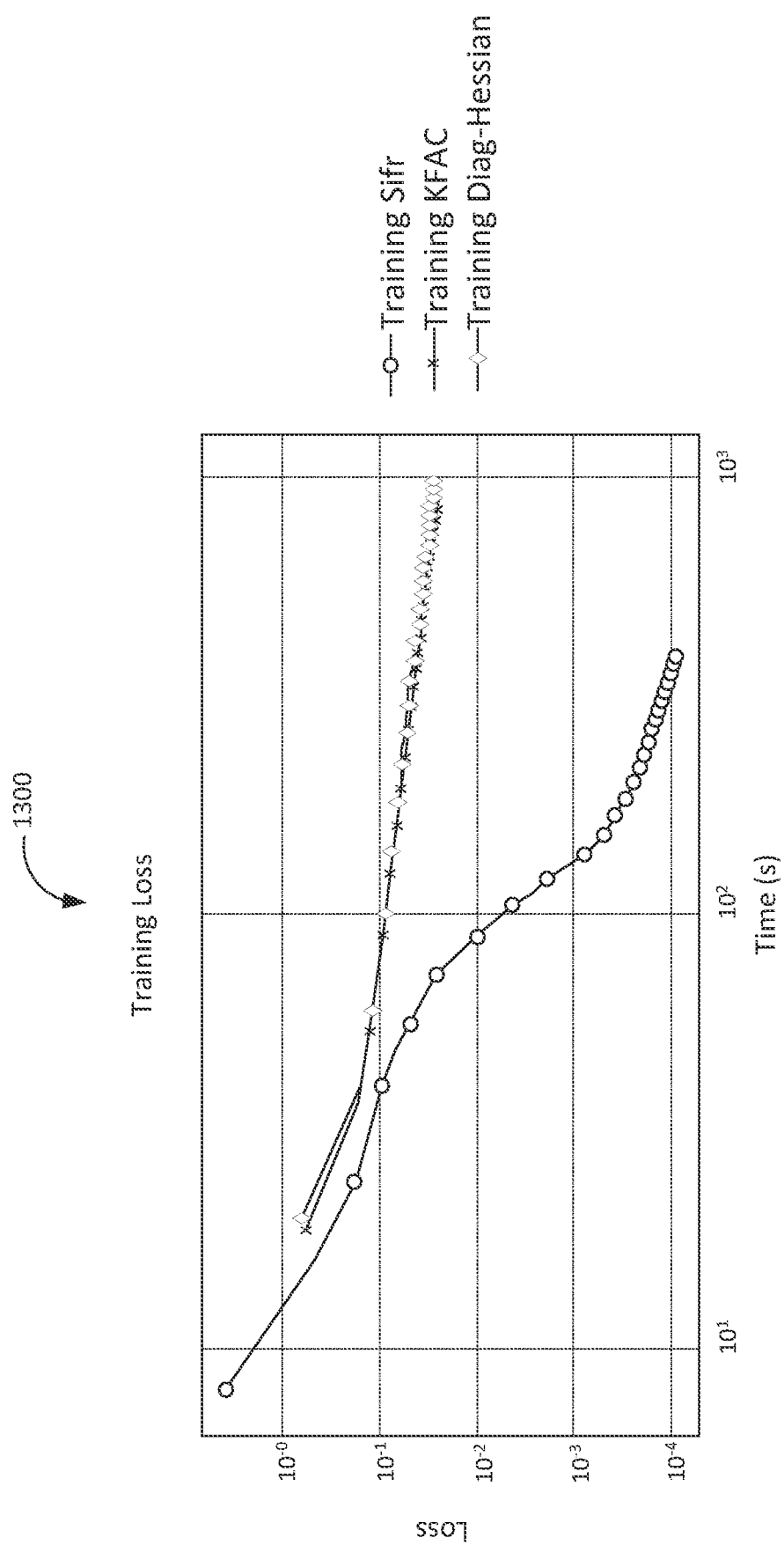
FIG. 13 is a graph 1300 of a training loss for facilitating the performance comparison of the Sifr optimizer with the other second order methods for the neural network training, in accordance with some embodiments.

FIG. 13 is a graph 1300 of a training loss for facilitating the performance comparison of the Sifr optimizer with the other second order methods for the neural network training, in accordance with some embodiments. Further, the loss of the training loss is measured against time (s).

Figure 14:
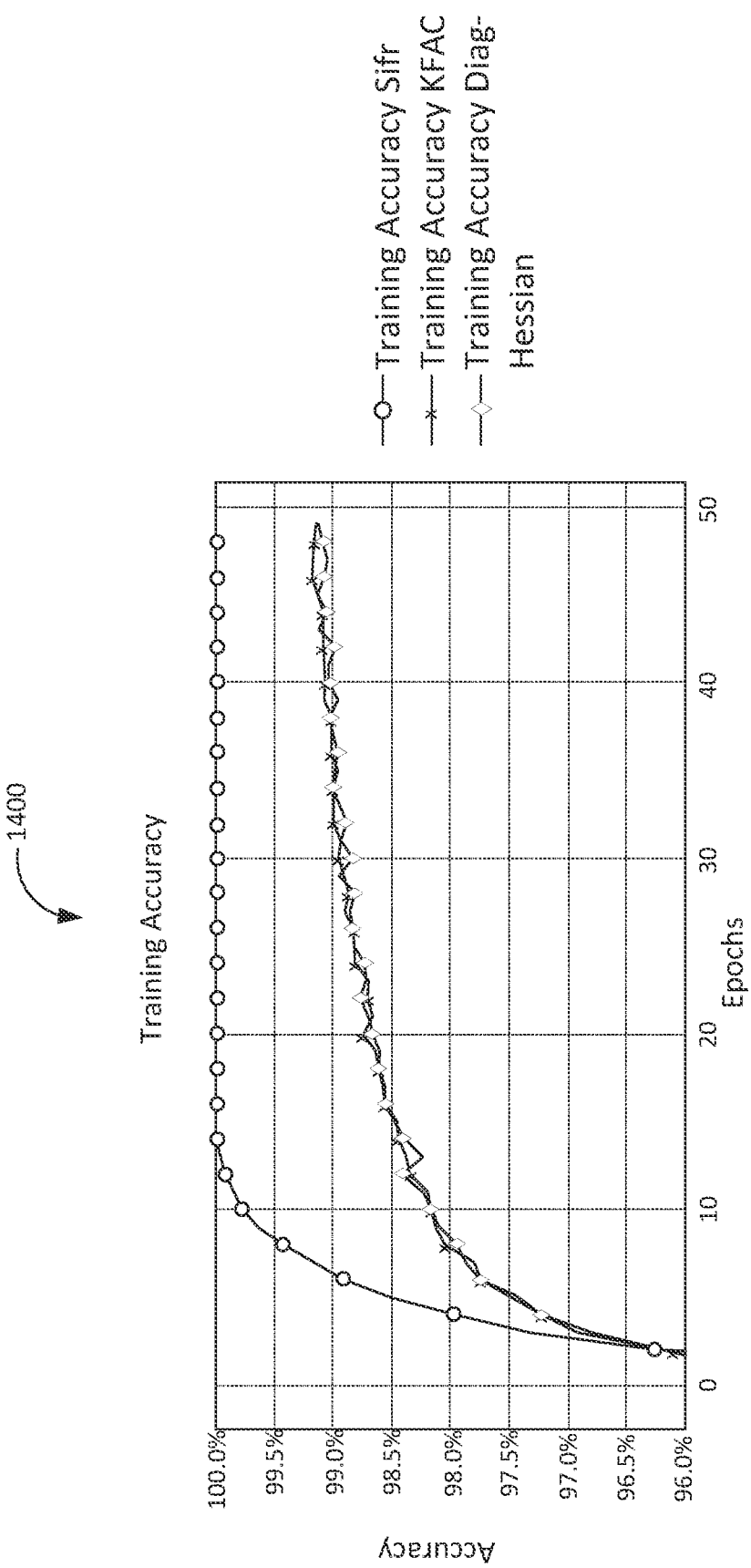
FIG. 14 is a graph 1400 of a training accuracy for facilitating the performance comparison of the Sifr optimizer with the other second order methods for the neural network training, in accordance with some embodiments.

FIG. 14 is a graph 1400 of a training accuracy for facilitating the performance comparison of the Sifr optimizer with the other second order methods for the neural network training, in accordance with some embodiments. Further, the accuracy of the training accuracy is measured against epoch.

Figure 15:
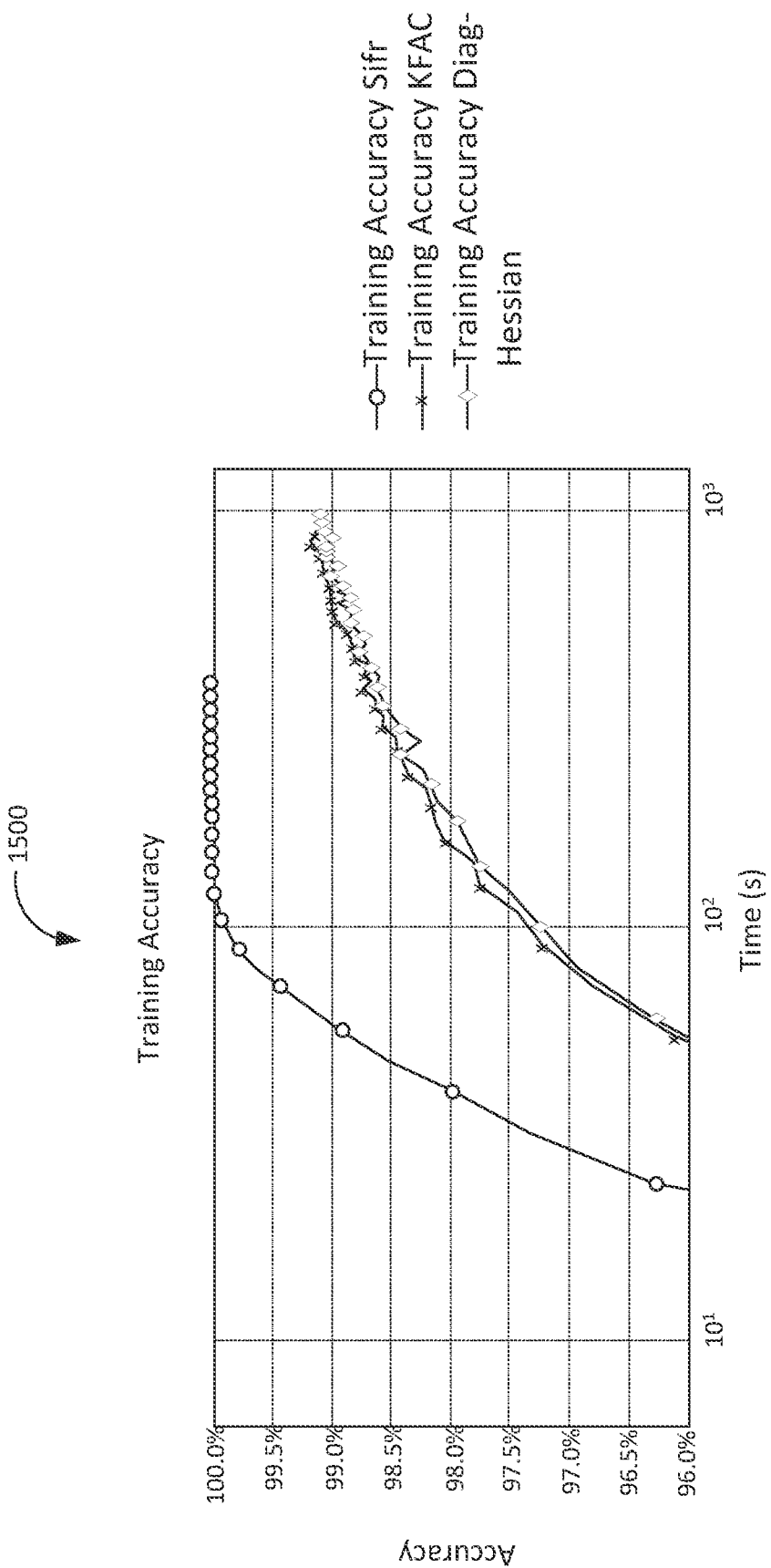
FIG. 15 is a graph 1500 of a training accuracy for facilitating the performance comparison of the Sifr optimizer with the other second order methods for the neural network training, in accordance with some embodiments.

FIG. 15 is a graph 1500 of a training accuracy for facilitating the performance comparison of the Sifr optimizer with the other second order methods for the neural network training, in accordance with some embodiments. Further, the accuracy of the training accuracy is measured against time (s).

Figure 16:
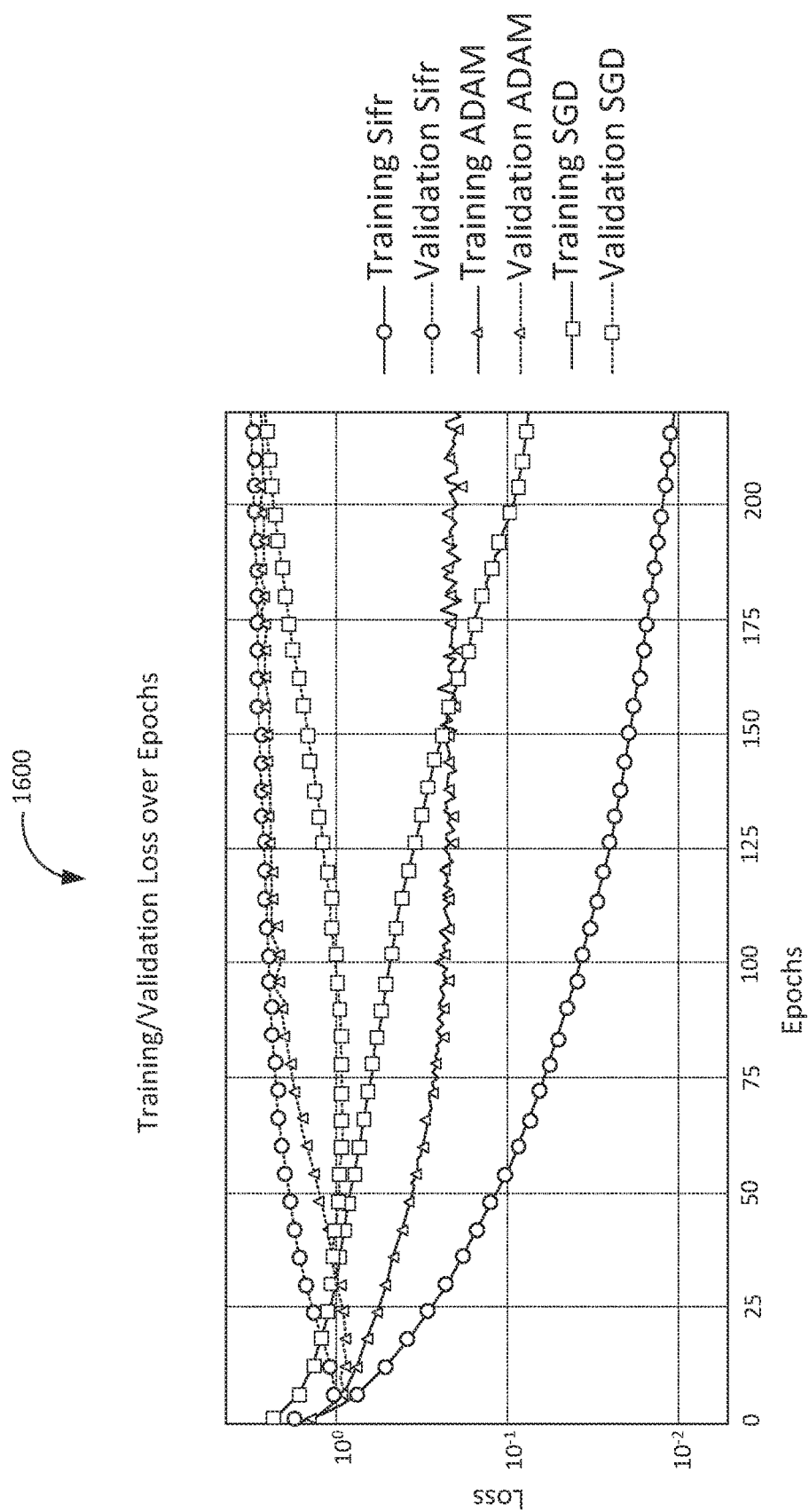
FIG. 16 is a graph 1600 of a training/validation loss over epochs for facilitating the performance comparison of a Sifr optimizer with the other first order methods for a neural network training, in accordance with some embodiments.

FIG. 16 is a graph 1600 of a training/validation loss over epochs for facilitating the performance comparison of a Sifr optimizer with the other first order methods for a neural network training, in accordance with some embodiments. Further, the loss of the training/validation loss is measured against epoch. Further, the other first order methods may include ADAM, SGD with momentum, etc. Further, the training/validation of the neural network is performed using the CIFAR-10 dataset and the neural network is a convolutional network consisting of three convolutional layers and one dense fully connected layer. The dataset was normalized to a range between 0.0 and 1.0 and split into training and validation (test) sets. A fixed learning rate of 0.1 was assigned for the Sifr Optimizer, while ADAM and SGD were deployed with TensorFlow's default parameters. The Sifr Optimizer outperforms by driving the loss function towards zero whilst maintaining competitive validation accuracy.

Figure 17:
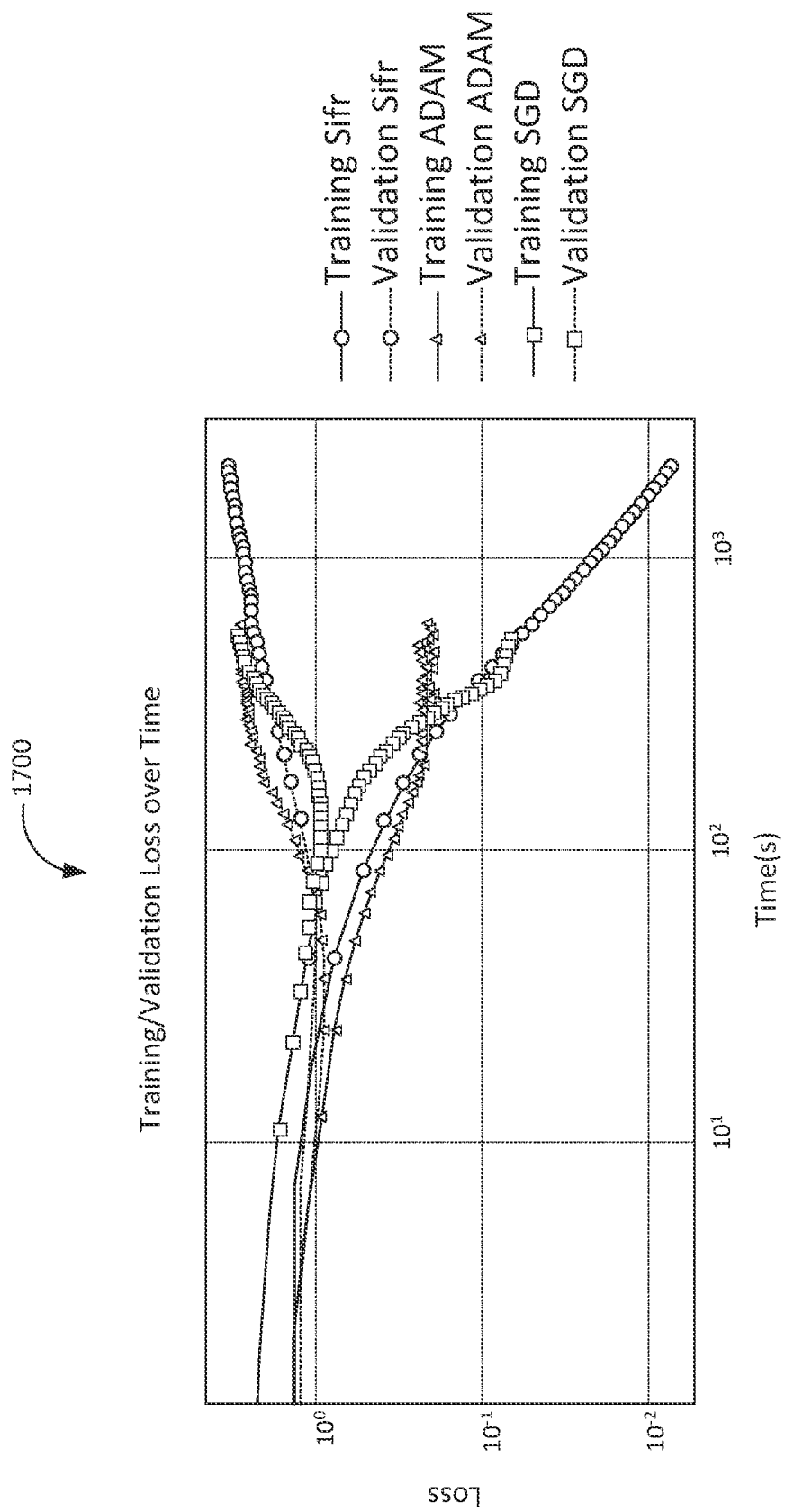
FIG. 17 is a graph 1700 of a training/validation loss over time for facilitating the performance comparison of the Sifr optimizer with the other first order methods for the neural network training, in accordance with some embodiments.

FIG. 17 is a graph 1700 of a training/validation loss over time for facilitating the performance comparison of the Sifr optimizer with the other first order methods for the neural network training, in accordance with some embodiments. Further, the loss of the training/validation loss is measured against time (s).

Figure 18:
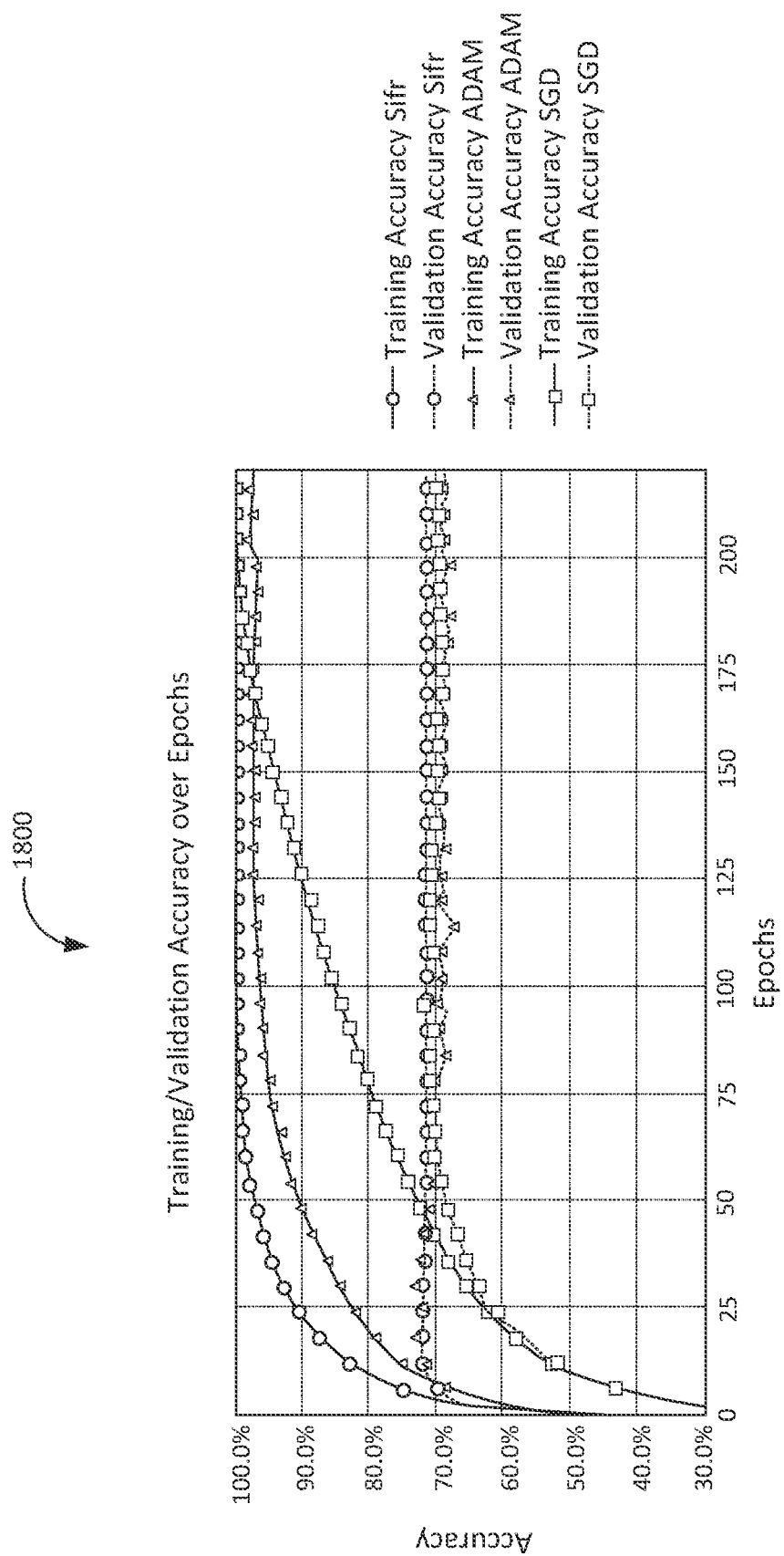
FIG. 18 is a graph 1800 of a training/validation accuracy over epochs for facilitating the performance comparison of the Sifr optimizer with the other first order methods for the neural network training, in accordance with some embodiments.

FIG. 18 is a graph 1800 of a training/validation accuracy over epochs for facilitating the performance comparison of the Sifr optimizer with the other first order methods for the neural network training, in accordance with some embodiments. Further, the accuracy of the training/validation accuracy is measured against the epoch.

Figure 19:
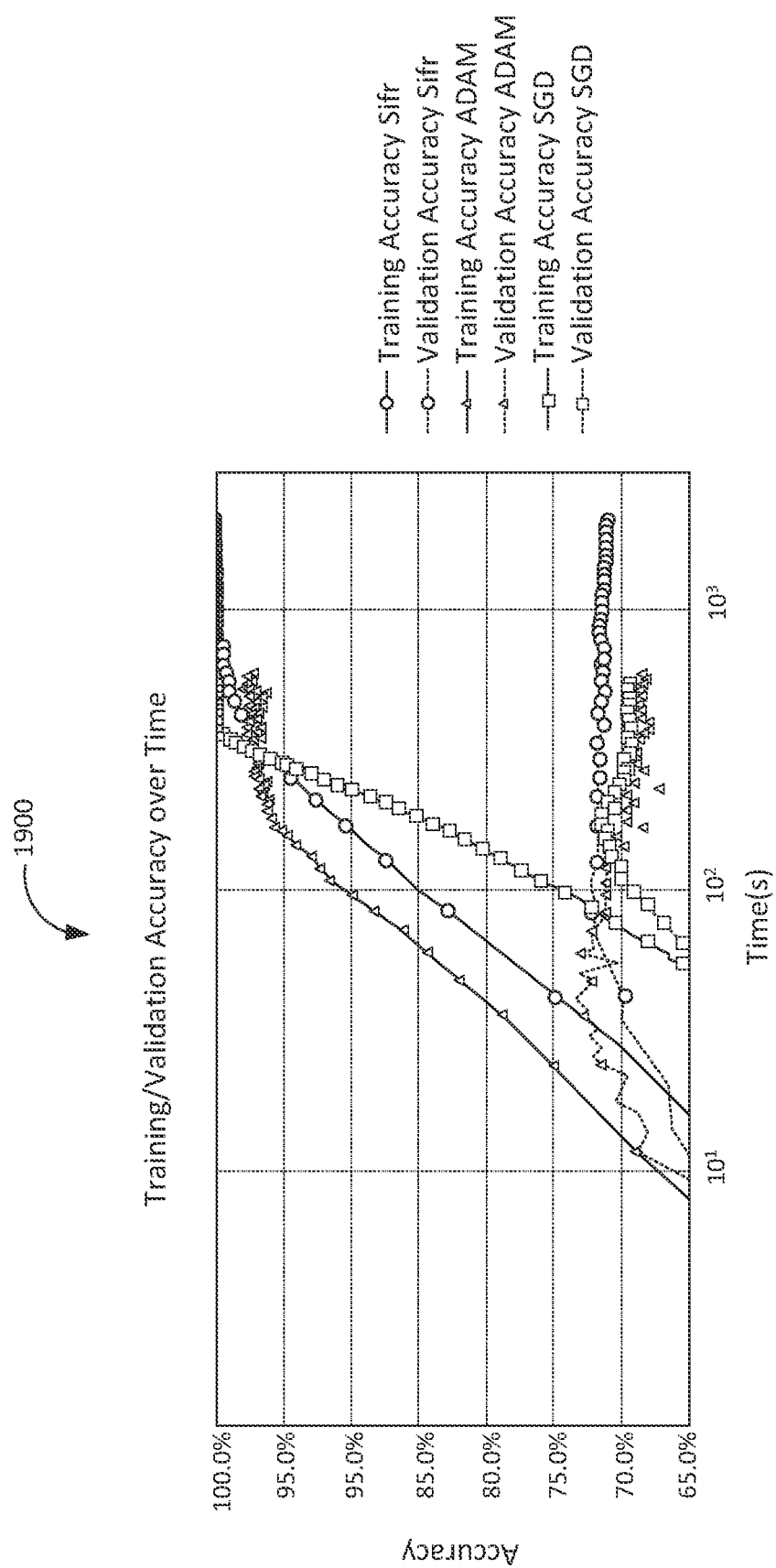
FIG. 19 is a graph 1900 of a training/validation accuracy over time for facilitating the performance comparison of the Sifr optimizer with the other first order methods for the neural network training, in accordance with some embodiments.

FIG. 19 is a graph 1900 of a training/validation accuracy over time for facilitating the performance comparison of the Sifr optimizer with the other first order methods for the neural network training, in accordance with some embodiments. Further, the accuracy of the training/validation accuracy is measured against time (s).

Figure 20:
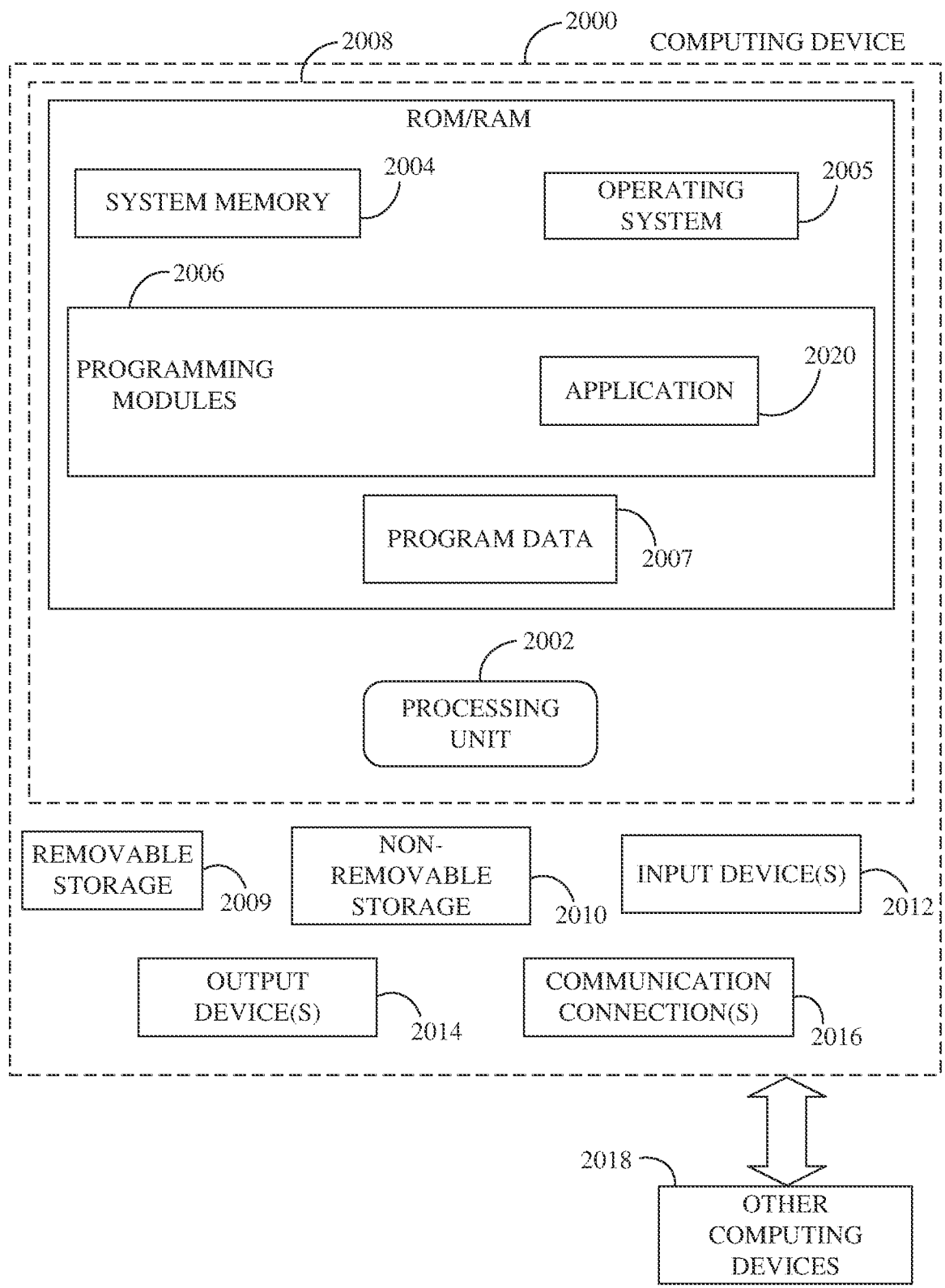
FIG. 20 is a block diagram of a computing device for implementing the methods disclosed herein, in accordance with some embodiments.

With reference to FIG. 20, a system consistent with an embodiment of the disclosure may include a computing device or cloud service, such as computing device 2000. In a basic configuration, computing device 2000 may include at least one processing unit 2002 and a system memory 2004. Depending on the configuration and type of computing device, system memory 2004 may comprise, but is not limited to, volatile (e.g., random-access memory (RAM)), non-volatile (e.g., read-only memory (ROM)), flash memory, or any combination. System memory 2004 may include operating system 2005, one or more programming modules 2006, and may include a program data 2007. Operating system 2005, for example, may be suitable for controlling computing device 2000's operation. In one embodiment, programming modules 2006 may include image-processing module and machine learning module. Furthermore, embodiments of the disclosure may be practiced in conjunction with a graphics library, other operating systems, or any other application program and is not limited to any particular application or system. This basic configuration is illustrated in FIG. 20 by those components within a dashed line 2008.

Computing device 2000 may have additional features or functionality. For example, computing device 2000 may also include additional data storage devices (removable and/or non-removable) such as, for example, magnetic disks, optical disks, or tape. Such additional storage is illustrated in FIG. 20 by a removable storage 2009 and a non-removable storage 2010. Computer storage media may include volatile and non-volatile, removable and non-removable media implemented in any method or technology for storage of information, such as computer-readable instructions, data structures, program modules, or other data. System memory 2004, removable storage 2009, and non-removable storage 2010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2000. Any such computer storage media may be part of device 2000. Computing device 2000 may also have input device(s) 2012 such as a keyboard, a mouse, a pen, a sound input device, a touch input device, a location sensor, a camera, a biometric sensor, etc. Output device(s) 2014 such as a display, speakers, a printer, etc. may also be included. The aforementioned devices are examples and others may be used.

Computing device 2000 may also contain a communication connection 2016 that may allow device 2000 to communicate with other computing devices 2018, such as over a network in a distributed computing environment, for example, an intranet or the Internet. Communication connection 2016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2004, including operating system 2005. While executing on processing unit 2002, programming modules 2006 may perform processes including, for example, one or more stages of methods, algorithms, systems, applications, servers, databases as described above. The aforementioned process is an example, and processing unit 2002 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

According to some aspects, a method for optimizing a neural network may include receiving an initial model of a neural network, implementing the Sifr optimizer that pursues parameter updates leading to exact Newton update at layers where the loss function is computed, and optimizing the model parameters until convergence of the optimization process or a stopping criteria is met.

Further, according to some aspects, the Sifr optimizer mitigates computational complexities associated with second-order optimization by solving for a reduced number of parameters equivalent to the batch size, irrespective of the model parameter dimensions.

Further, according to some aspects, the Sifr optimizer utilizes damping to enhance the conditioning of its inherent system, thereby facilitating more effective neural network training.

Further, according to some aspects, the Sifr optimizer employs convexity corrected gradients to reduce the parameters search space, leading to improved computational efficiency.

Further, according to some aspects, the Sifr Optimizer optimizes the training across various neural network architectures with standard activation functions, including but not limited to Convolutional Neural Networks (CNNs), Recurrent Neural Networks (RNNs), and Transformers.

Further, according to some aspects, the Sifr Optimizer accomplishes a rapid reduction in loss per epoch and reaches a lower loss level beyond what standard methods achieve, while maintaining competitive accuracy performance.

Further, according to some aspects, the Sifr optimizer enables accelerated convergence and improved fitting in neural network training by considering parameters search to create an exact Newton update at layers where the loss function is computed.

Further, according to some aspects, the Sifr optimizer effectively trains neural networks with a large number of layers, demonstrating its scalability and adaptability to various scales of neural network implementations.

Further, according to some aspects, the Sifr Optimizer effectively trains neural networks on various tasks, including but not limited to image classification, language translation, and reinforcement learning.

Further, according to some aspects, the Sifr Optimizer effectively trains neural networks with various types of data, including but not limited to images, text, audio, and video, illustrating its versatility across different data types and tasks.

Further, according to some aspects, the Sifr Optimizer addresses non-convexity issues that are inherent in the standard Newton method by including quadratic terms when canceling the gradient, further enhancing the optimization process.

Further, according to some aspects, the Sifr Optimizer applies theoretical considerations that depart from standard Newton methods, yielding an optimizer that performs second-order updates without the computational complexity of forming the Hessian or its inverse.

Further, according to some aspects, the Sifr Optimizer achieves dimensionality reduction during the optimization process by leveraging the differential properties inherent in neural networks.

Further, according to some aspects, the Sifr Optimizer effectively optimizes various neural network architectures regardless of their size, demonstrating the scalability and versatility of the method.

According to some aspects, a device (computing system) for neural network optimization configured with standard components and potentially benefiting from additional resources such as multiple GPUs and extra RAM, may include an interface for inputting the initial model of the neural network, a data processing unit (processor) implementing the Sifr optimizer for training the neural network.

Further, according to some aspects, the Sifr optimizer in the data processing unit characterizes the Sifr update for optimization by reducing the parameter space to a vector of size equivalent to the batch size.

Further, according to some aspects, the Sifr optimizer in the data processing unit performs second-order updates, accommodating convexity corrections, and reducing dimensionality, leading to an efficient and accurate optimization process.

Further, according to some aspects, the Sifr optimizer in the data processing unit optimizes the training across various neural network architectures with standard activation functions, providing enhanced second-order training functionality across different neural network designs.

Further, according to some aspects, the data processing unit is configured with specific components and settings to facilitate the implementation of the Sifr Optimizer, providing a hardware solution that supports the efficient optimization of neural networks.

Further, according to some aspects, the Sifr Optimizer in the data processing unit can be efficiently implemented on multiple GPUs and with extensive RAM, demonstrating the flexibility of the method with respect to hardware configurations.

Although the present disclosure has been explained in relation to its preferred embodiment, it is to be understood that many other possible modifications and variations can be made without departing from the spirit and scope of the disclosure.

What is claimed is:

1. A method for training a neural network model having a plurality of layers comprising an input layer, at least one middle layer, one or more output layers, and a plurality of parameters commonly referred to as weights and biases, the method comprising:
providing an input to the input layer, wherein the input corresponds to each of a plurality of samples comprised in a batch of a training dataset;
obtaining one or more outputs from the neural network model based on the input;
calculating a loss function for each of the plurality of samples comprised in the batch based on the one or more outputs and one or more corresponding desired values for each of the plurality of samples comprised in the batch; and
determining a plurality of values for the plurality of parameters based on the loss function, wherein the plurality of values for the plurality of parameters minimizes a mismatch between the one or more outputs and the one or more corresponding desired values across the plurality of samples comprised in the batch, wherein the determining of the plurality of values for the plurality of parameters comprises:
running a forward model through the plurality of layers based on the neural network model;
determining a Sifrian functional which is a second-order Lagrangian for the plurality of layers based on the forward model, backpropagation, and gradient definition, wherein the Sifrian functional is null when a forward pass, a backward pass, and a gradient definition associated with the neural network model are verified;
determining a plurality of equations from the Sifrian functional; and
transforming, reducing, and solving the plurality of equations, wherein the solving of the plurality of equations comprises transformations allowing:
determining a pivotal equation from the plurality of equations;
resolving the pivotal equation based on the determining of the pivotal equation; and
obtaining at least a second-order update for the plurality of parameters using the pivotal equation based on the resolving, wherein the determining of the plurality of values of the plurality of parameters is further based on at least the second-order update.

2. The method of claim 1, wherein the Sifrian functional integrates the forward pass, the backward pass, and the gradient definition for the neural network model.

3. The method of claim 1, wherein the determining of the Sifrian functional comprises excluding the loss function from the Sifrian functional and including a plurality of second-order adjoint variables in the Sifrian functional.

4. The method of claim 3, wherein the determining of the plurality of equations comprises determining a characterization of at least a second-order update for the neural network model via at least one of the plurality of second-order adjoint variables.

5. The method of claim 4, wherein the determining of the plurality of values for the plurality of parameters further comprises:
computing a gradient for the plurality of layers via backpropagation; and
integrating the gradient into the characterization of at least the second-order update, wherein at least the second-order update is a second-order Newton update, wherein the determining of the characterization further comprises differentiating the Sifrian functional to derive at least one co-adjoint equation for the forward pass and the backward pass and at least one equation for at least the second-order update for the plurality of parameters.

6. The method of claim 1, wherein the pivotal equation comprises a damping term to handle potential ill-conditioning of the pivotal equation.

7. The method of claim 1, wherein the solving of the plurality of equations further comprises:
reducing a dimensionality of the pivotal equation via sketching the pivotal equation; and
determining a dimensionally reduced pivotal equation based on the reducing, wherein the resolving further comprises resolving the dimensionally reduced pivotal equation.

8. The method of claim 7, wherein the dimensionally reduced pivotal equation is $$\left(\frac{\partial \ell}{\partial \theta}\right)^T S = \left(\frac{\partial \ell}{\partial x_n}\right)^T \left(\frac{\partial^2 \ell}{\partial x_n^2}\right)^{-1} \left(\frac{\partial \ell}{\partial x_n}\right) + \epsilon.$$

9. A method for training a neural network model having a plurality of layers comprising an input layer, at least one middle layer, one or more output layers, and a plurality of parameters commonly referred to as weights and biases, the method comprising:
providing an input to the input layer, wherein the input corresponds to each of a plurality of samples comprised in a batch of a training dataset;
obtaining one or more outputs from the neural network model based on the input;
calculating a loss function for each of the plurality of samples comprised in the batch based on the one or more outputs and one or more corresponding desired values for each of the plurality of samples comprised in the batch; and
determining a plurality of values for the plurality of parameters based on the loss function, wherein the plurality of values for the plurality of parameters minimizes a mismatch between the one or more outputs and the one or more corresponding desired values across the plurality of samples comprised in the batch, wherein the determining of the plurality of values for the plurality of parameters comprises:
  running a forward model through the plurality of layers based on the neural network model;
  determining a Sifrian functional which is a second-order Lagrangian for the plurality of layers based on the forward model, backpropagation, and gradient definition, wherein the Sifrian functional is null when a forward pass, a backward pass, and a gradient definition associated with the neural network model are verified;
  determining a plurality of equations from the Sifrian functional; and
  transforming, reducing, and solving the plurality of equations, wherein the solving of the plurality of equations comprises:
    determining a pivotal equation from the plurality of equations;
    resolving the pivotal equation based on the determining of the pivotal equation; and
    obtaining at least a second-order update for the plurality of parameters using the pivotal equation based on the resolving, wherein the determining of the plurality of values of the plurality of parameters is further based on at least the second-order update.

10. The method of claim 9, wherein the Sifrian functional integrates the forward pass, the backward pass, and the gradient definition for the neural network model.

11. A neural network model comprising a plurality of layers comprising an input layer, at least one middle layer, one or more output layers, and a plurality of parameters commonly referred to as weights and biases, wherein the neural network model is trained using a method, wherein the method comprises:
  providing an input to the input layer, wherein the input corresponds to each of a plurality of samples comprised in a batch of a training dataset;
  obtaining one or more outputs from the neural network model based on the input;
  calculating a loss function for each of the plurality of samples comprised in the batch based on the one or more outputs and one or more corresponding desired values for each of the plurality of samples comprised in the batch; and
  determining a plurality of values for the plurality of parameters based on the loss function, wherein the plurality of values for the plurality of parameters minimizes a mismatch between the one or more outputs and the one or more corresponding desired values across the plurality of samples comprised in the batch, wherein the determining of the plurality of values for the plurality of parameters comprises:
    running a forward model through the plurality of layers based on the neural network model;
    determining a Sifrian functional which is a second-order Lagrangian for the plurality of layers based on the forward model, backpropagation, and gradient definition, wherein the Sifrian functional is null when a forward pass, a backward pass, and a gradient definition associated with the neural network model are verified;
    determining a plurality of equations from the Sifrian functional; and
    transforming, reducing, and solving the plurality of equations, wherein the solving of the plurality of equations comprises transformations allowing:
      determining a pivotal equation from the plurality of equations;
      resolving the pivotal equation based on the determining of the pivotal equation; and
      obtaining at least a second-order update for the plurality of parameters using the pivotal equation based on the resolving, wherein the determining of the plurality of values of the plurality of parameters is further based on at least the second-order update.

12. The neural network model of claim 11, wherein the Sifrian functional integrates the forward pass, the backward pass, and the gradient definition for the neural network model.

13. The neural network model of claim 11, wherein the determining of the Sifrian functional comprises excluding the loss function from the Sifrian functional and including a plurality of second-order adjoint variables in the Sifrian functional.

14. The neural network model of claim 13, wherein the determining of the plurality of equations comprises determining a characterization of at least a second-order update for the neural network model via at least one of the plurality of second-order adjoint variables.

15. The neural network model of claim 14, wherein the determining of the plurality of values for the plurality of parameters further comprises:
  computing a gradient for the plurality of layers via backpropagation; and
  integrating the gradient into the characterization of at least the second-order update, wherein at least the second-order update is a second-order Newton update, wherein the determining of the characterization further comprises differentiating the Sifrian functional to derive at least one co-adjoint equation for the forward pass and the backward pass and at least one equation for at least the second-order update for the plurality of parameters.

16. The neural network model of claim 11, wherein the pivotal equation comprises a damping term to handle potential ill-conditioning of the pivotal equation.

17. The neural network model of claim 11 wherein the solving of the plurality of equations further comprises:
  reducing a dimensionality of the pivotal equation via sketching the pivotal equation; and
  determining a dimensionally reduced pivotal equation based on the reducing, wherein the resolving further comprises resolving the dimensionally reduced pivotal equation.

18. The neural network model of claim 17, wherein the dimensionally reduced pivotal equation is $$\left(\frac{\partial \ell}{\partial \theta}\right)^T S = \left(\frac{\partial \ell}{\partial x_n}\right)^T \left(\frac{\partial^2 \ell}{\partial x_n^2}\right)^{-1} \left(\frac{\partial \ell}{\partial x_n}\right) + \epsilon.$$

* * * * *